US010055773B2

(12) United States Patent
Beck

(10) Patent No.: US 10,055,773 B2
(45) Date of Patent: Aug. 21, 2018

(54) SYSTEM AND METHODS FOR GENERATING USER INTERFACES FOR CUSTOM CARD DESIGN SESSION

(71) Applicant: CPI Card Group—Colorado, Inc., Littleton, CO (US)

(72) Inventor: Brian Christopher Beck, Fort Wayne, IN (US)

(73) Assignee: CPI Card Group—Colorado, Inc., Littleton, CO (US)

( * ) Notice: Subject to any disclaimer, the term of this patent is extended or adjusted under 35 U.S.C. 154(b) by 153 days.

(21) Appl. No.: 14/067,612

(22) Filed: Oct. 30, 2013

(65) Prior Publication Data

US 2014/0122288 A1 May 1, 2014

Related U.S. Application Data

(60) Provisional application No. 61/720,287, filed on Oct. 30, 2012.

(51) Int. Cl.
*G06Q 30/00* (2012.01)
*G06Q 30/06* (2012.01)

(52) U.S. Cl.
CPC ................. *G06Q 30/0621* (2013.01)

(58) Field of Classification Search
CPC ................................ G06Q 30/0621
USPC ............... 705/26.1–27.2, 14.1, 319
See application file for complete search history.

(56) References Cited

U.S. PATENT DOCUMENTS

| | | | |
|---|---|---|---|
| 7,992,774 B2 | 8/2011 | Lynch et al. | |
| 2004/0099730 A1* | 5/2004 | Tuchler | G06K 17/0022 235/380 |
| 2005/0097008 A1 | 5/2005 | Ehring | |
| 2006/0174199 A1* | 8/2006 | Soltis | G06F 17/211 715/700 |
| 2007/0267485 A1 | 11/2007 | Ferrara | |
| 2008/0308636 A1 | 12/2008 | Lynch | |

* cited by examiner

*Primary Examiner* — William J Allen
*Assistant Examiner* — Anand R Loharikar
(74) *Attorney, Agent, or Firm* — Marsh Fischmann & Breyfogle LLP

(57) ABSTRACT

A transaction card customization system that includes a customer user interface that is generatable based on a customization parameter indicative of at least one of a customer context and a product context of the user interface. An administrative user interface is described that facilitates an administrative user establishing a consumer user interface based on a customer context and/or product context. In turn, a locator is generated that includes the customization parameter indicative of the customer context and/or product context. As such, upon a user utilizing the locator to navigate to a custom card design server, a payload including the customization parameter is received at the custom card design server and used to generate the customer user interface based on the indicated customer context and/or product context.

11 Claims, 20 Drawing Sheets

Acme, INC.
304a

TERMS AND CONDITIONS 306a
302a

ENGLISH | SVENSKA 308a

MY BASKET & CHECKOUT

MY BASKET

LOAD YOUR CARD WITH ANY AMOUNT WITHIN THE RANGE SHOWN. YOU CAN ADD MORE GIFTS TO YOUR BASKET BY SELECTING ADD ANOTHER ITEM. IF YOUR HAPPY WITH YOUR ORDER GO STRAIGHT TO CHECKOUT NOW. IF NOT YOU CAN EDIT OR REMOVE AND START AGAIN.

CHECKOUT

LOG STRAIGHT IN IF YOU HAVE ORDERED GIFTS WITH US BEFORE OR REGISTER IF IT'S YOUR FIRST TIME. YOUR GIFT ORDERING ACCOUNT IS SEPARATE TO YOUR TICKETMASTER MY ACCOUNT YOU MAY HAVE. ADD A PERSONAL MESSAGE THAT WE WILL PLACE INSIDE THE GREETING CARD OR TEMPLATE FOR E-GIFT CARDS. YOU'RE NOW GOOD TO PAY OR SAVE YOUR ORDER TO COMPLETE LATER. WE ACCEPT ALL MAJOR CREDIT AND DEBIT CARDS.

LINKS

LOGIN TO YOUR ACCOUNT

314a

MY BASKET
ADD ANOTHER ITEM...
PRODUCT  PERSONALISED  QUANTITY  ENTER AMOUNT WITHIN RANGE  ACTION
[ ]          [ ]           1         50-2000 SEK [v] [ ]   EDIT | REMOVE...
          PREVIEW                   316a           CHECKOUT NOW

REGISTER/LOGIN

[ REGISTER A NEW ACCOUNT ][ LOGIN TO AN EXISTING ACCOUNT ]
PRODUCT ORDERING ACCOUNT SEPARATE TO MY ACCOUNT.
EMAIL ADDRESS       •  [          ]
RETYPE EMAIL        •  [          ]
PASSWORD            •  [          ]
RETYPE PASSWORD     •  [          ]                 318a
SECURITY QUESTION   •  [ SELECT         v]
SECURITY RESPONSE   •  [          ]         (REGISTER)
                    • INDICATE A REQUIRED FIELD

CONTACT INFORMATION
CONTACT NAME   •  [              ]
CONTACT EMAIL  •  [              ]              320a
CONTACT PHONE  •  [              ]
          [ ] UPDATE MY CONTACT RECORD WITH THIS INFORMATION
  • INDICATES A REQUIRED FIELD  (SAVE AND RETURN LATER)(CONTINUE)

DELIVERY AND SHIPPING
SEND FROM NAME            •  [          ]
SEND FROM EMAIL ADDRESS   •  [          ]
SEND TO NAME              •  [          ]
SEND TO EMAIL ADDRESS     •  [          ]
SEND TO EMAIL (CONFIRM)   •  [          ]
PERSONAL MESSAGE (MAX. 250 CHARACTERS) [    ]
          322a
CHOOSE A DELIVERY DATE (OPTIONAL) [    ] YY/MM/DD
  • INDICATES A REQUIRED FIELD  (SAVE AND RETURN LATER)(CONTINUE)

PAYMENT
BILLING ADDRESS:           *CARD HOLDER NAME [    ]
[X] USE ACCOUNT ADDRESS    *CARD NUMBER      [    ]
                           *EXPIRY DATE  [MONTH v][YEAR v]
          324a             *SECURITY CODE

Acme, INC. 304a

TERMS AND CONDITIONS 306a

302a

ENGLISH | SVENSKA 308a

MIN VARUKORG & BETALNING

MIN VARUKORG

LADDA DITT KORT MED VALFRITT BELOPP INOM DET INTERVALL SOM VISAS TILL HÖGER. DU KAN LÄGGA TILL FLER PRESENTKORT GENOM ATT VÄLJA LÄGG TILL YTTERLIGARE PRESENTKORT. NÄR DU ÄR NÖJD MED DIN BESTÄLLNING GÅ TILL KASSAN.

BETALNING

LOGGA IN PÅ DITT PRESENTKORTSKONTO, (DITT PRESENTKORTSKONTO ÄR SEPARAT FRÅN DITT ANVÄNDARKONTO PÅ TICNET.) LÄGG TILL ETT PERSONLIGT MEDDELANDE SOM KOMMER ATT SKRIVAS INUTI KONVOLUTET ELLER PÅ DITT EPRESENTKORT. VI ACCEPTERAR VISA, MASTERCARD & AMERICAN EXPRESS.

PRESENTKORTSKONTOT

LOGGA IN HÄR: PÅ DITT PRESENTKORTSKONTO. OBS! DETTA ÄR ETT SEPARAT KONTO FRÅN DITT TICNET KONTO. (HAR DU INGET KONTO SKAPAR DU DET SENARE I FLÖDET)

314b

MY BASKET
ADD ANOTHER ITEM...
PRODUCT  PERSONALISED  QUANTITY  ENTER AMOUNT WITHIN RANGE  ACTION
[ ]      [ ]           [1]       [50-2000 USD ▼] [ ]        EDIT | REMOVE...
PREVIEW                                     316b          CHECKOUT NOW

REGISTER/LOGIN
[REGISTER A NEW ACCOUNT] [LOGIN TO AN EXISTING ACCOUNT]
PRODUCT ORDERING ACCOUNT SEPARATE TO MY ACCOUNT.
EMAIL ADDRESS    •  [          ]
RETYPE EMAIL     •  [          ]
PASSWORD         •  [          ]
RETYPE PASSWORD  •  [          ]         318b
SECURITY QUESTION • [SELECT        ▼]
SECURITY RESPONSE •  [          ]        (REGISTER)
                  • INDICATE A REQUIRED FIELD

CONTACT INFORMATION
CONTACT NAME   •  [          ]
CONTACT EMAIL  •  [          ]           320b
CONTACT PHONE  •  [          ]
               [ ] UPDATE MY CONTACT RECORD WITH THIS INFORMATION
• INDICATES A REQUIRED FIELD  (SAVE AND RETURN LATER) (CONTINUE)

DELIVERY AND SHIPPING
SEND FROM NAME          •  [          ]
SEND FROM EMAIL ADDRESS •  [          ]
SEND TO NAME            •  [          ]
SEND TO EMAIL ADDRESS   •  [          ]
SEND TO EMAIL (CONFIRM) •  [          ]
PERSONAL MESSAGE (MAX. 250 CHARACTERS)  [    ]
                          322b
CHOOSE A DELIVERY DATE (OPTIONAL)  [    ] MM/DD/YY
• INDICATES A REQUIRED FIELD  (SAVE AND RETURN LATER) (CONTINUE)

PAYMENT
BILLING ADDRESS:         *CARD HOLDER NAME [          ]
☒ USE ACCOUNT ADDRESS    *CARD NUMBER      [          ]
         324b            *EXPIRY DATE      [MONTH ▼][YEAR ▼]
                         *SECURITY CODE

350b

CUSTOMER LIST

SEARCH

CUSTOMER NAME [      ]
STATUS  ☑ACTIVE  ☐INACTIVE

SELECT VIEW: [HIERARCHICAL ▽]   [SEARCH]

| CUSTOMER NAME | RM | STATUS | LAST UPDATE | ACTIONS |
|---|---|---|---|---|
| MYCA SYSTEM ~ 512 | MYCA | ACTIVE | 5/18/2009 2:51:52 PM | NEW CUSTOMER... ~530 NEW USER \| EDIT \| DELETE.. |
| CREDIT UNION SERVICE PROVIDER ~ 514 | CU-GSP | ACTIVE | 5/11/2009 8:50:23 AM | NEW USER \| EDIT \| DELETE.. |
| ACME EMPLOYEES FEDERAL CREDIT UNION ~516 | CU-ACME | ACTIVE | 5/11/2009 8:51:18 AM | NEW USER \| EDIT \| DELETE.. |
| HOTEL AND TRAVEL INDUSTRY FCU ~516 | CU-HOTEL | ACTIVE | 5/12/2009 1:33:39 PM | NEW USER \| EDIT \| DELETE.. |
| FIRST NATIONAL BANK ~ 514 | BANK-001 | ACTIVE | 5/11/2009 8:53:29 AM | NEW USER \| EDIT \| DELETE.. |
| AFFINITY: FlyFar AIRLINES ~ 516 | FLYFAR | ACTIVE | 5/11/2009 8:49:49 AM | NEW USER \| EDIT \| DELETE.. |
| AFFINITY: UNIVERSITY OF COLORADO ~516 | UCO-001 | ACTIVE | 5/11/2009 8:49:16 AM | NEW USER \| EDIT \| DELETE.. |
| UCO ALUMNI ASSOCIATION ~ 518 | UCO-011 | ACTIVE | 5/11/2009 8:49:03 AM | NEW USER \| EDIT \| DELETE.. |
| UCO FOOTBALL ~ 518 | UCO-012 | ACTIVE | 5/11/2009 8:49:34 AM | NEW USER \| EDIT \| DELETE.. |

| EDIT CUSTOMER |
| --- |

| BASIC | SITE SETUP | ORDERING | PRODUCTS | HANDLING |

CUSTOMER/ORDER-LEVEL CONFIGURATION — 630

LOCALE OPTIONS
DEFAULT LOCALE     [UNITED STATES (US) ▼]   SPECIFY VALUE ▼ ← 621
DEFAULT CURRENCY    [US DOLLAR (USD) ▼]

SHOPPING CART
OPTIONS     SPECIFY VALUE ▼ ← 622
☑ ENABLE CART - MULTIPLE LINE ITEMS ← 624

ORDER OPTIONS     SPECIFY VALUE ▼ ← 623
                                ← 625

ORDER FORM     ☑ ENABLE ORDER FORM
ORDER FIELDS
     ☐ BUSINESS INFO
     ☑ CONTACT INFO
         ☑ CONTACT NAME
         ☑ CONTACT EMAIL    ← 626
         ☐ CONTACT ADDRESS
         ☑ CONTACT PHONE
         ☐ CONTACT FAX
         ☐ BEST TIME TO CONTACT
     ☐ ENABLE ORDER ACKNOWLEDGMENT
     ☐ DISABLE ORDER PRICING DISPLAY
     ☐ ENABLE INVOICING REQUESTS/PROCESSING

FIXED/BASE ORDER CHARGE
MINIMUM ORDER VALUE
MAXIMUM ORDER VALUE    [10,000.00]   (BLANK, FOR UNLIMITED)
ADMINISTRATIVE ORDER APPROVAL    ☐ ORDERS REQUIRES ADMINISTRATIVE APPROVAL

FIG. 15

MANAGE LOCALES

| NAME | ABBR | LCID | COUNTRY | CURRENCY | LANGUAGE | STATUS | ACTIONS |
|---|---|---|---|---|---|---|---|
| UNITED STATES | US | 1033 | UNITED STATES | US DOLLAR | ENGLISH INTERNATIONAL | ACTIVE | EDIT \| DELETE... |

NEW LOCALE... — 700

FIG. 16A

EDIT LOCALE — 701

BASIC INFORMATION

NAME *                        — 702
ABBREVIATION *       — 704
BROWSER LCID          — 706
DATE/TIME FORMAT * MM/DD/YYYY — 708
DEFAULT COUNTRY * SELECT... — 710
DEFAULT CURRENCY * SELECT... — 712
DEFAULT LANGUAGE * SELECT... — 714
☑ IS ACTIVE

CANCEL  SAVE

FIG. 16B

MANAGE CURRENCIES　　　　　　　　　　NEW CURRENCY...

| NAME | ABBR | SYMBOL | CONV RATE | STATUS | DEFAULT | ACTIONS |
|---|---|---|---|---|---|---|
| EURO | EUR | € | 0.7651 | ACTIVE | | EDIT \| DELETE |
| UK POUND | GBP | £ | 0.62527 | ACTIVE | | EDIT \| DELETE |
| US DOLLAR | USD | $ | 1 | ACTIVE | | EDIT \| DELETE |

EDIT CURRENCY ← 801

| BASIC INFORMATION |
- NAME ← 802
- ABBREVIATION ← 804
- SYMBOL ← 806
- ☐ DEFAULT CURRENCY
- ☑ IS ACTIVE

| CONVERSION RATE |
- RATE  0.0000 TO 1.00 USD ← 808
- ☑ AUTOMATICALLY UPDATE RATE ← 810
- LAST UPDATE  N/A

[CANCEL] [SAVE]

FIG. 17B

| PRODUCT-LEVEL CONFIGURATION | |
|---|---|
| ORDER LINE ITEM OPTIONS | SPECIFY VALUE ▾ — 631 |
| THE FOLLOWING ITEMS ONLY APPLY WHEN AN ORDER FORM IS ENABLED. | |
| MINIMUM ITEM QUANTITY | [ ] (BLANK, FOR SINGLE QUANTITY) |
| MAXIMUM ITEM QUANTITY | [ ] (BLANK, FOR UNLIMITED) |
| VALID QUANTITIES | [ ] (E.G., 100, 250, 500) |
| MINIMUM ITEM VALUE | [ ] (BLANK, FOR NONE) |
| MAXIMUM ITEM VALUE | [ ] (BLANK, FOR UNLIMITED) |
| DELIVERY/NEED BY DATE | ☑ ENABLE DELIVERY/NEED BY DATE — 632 |
| | MIN HORIZON [7] DAYS (BLANK FOR NONE) |
| | MAX HORIZON [30] DAYS (BLANK FOR NONE) |
| PROMO CODE | ☐ ENABLE PROMOTIONAL/DISCOUNT CODE |
| FULFILLMENT OPTIONS | SPECIFY VALUE ▾ — 633 |
| MEDIA TYPE | PHYSICAL ▾ |
| | ☑ CARDS SHIP ACTIVATED |
| | ☑ SHIP TO ADDRESS — 634 |
| | ☑ SHIPPING OPTION SELECTION |
| FULFILLMENT METHOD DATA FILE | AUTOMATED ▾ |
| | ☐ ENABLE UPLOAD OF A FULFILLMENT DATA FILE |
| PACKAGING OPTIONS | SPECIFY VALUE ▾ — 635 |
| OPTIONS | ☑ ENABLE PACKAGING — 636 |
| | ☐ ENABLE A DELIVERY MESSAGE |
| DENOMINATION OPTIONS | SPECIFY VALUE ▾ — 637 |
| OPTIONS | ☑ ENABLE DENOMINATION SELECTION — 638 |
| VALID DENOMINATIONS | [0-200] (E.G., 10, 20, 50, 100 OR 0-200) |
| PROOFING OPTIONS | SPECIFY VALUE ▾ — 639 |
| OPTIONS | ☑ ENABLE ON SCREEN REVIEW |
| | ☐ ENABLE PROOF FILE DOWNLOAD |
| | ☐ REQUIRE PROOF APPROVAL |
| | [CANCEL] [SAVE] — 640 |

MYCA CDD v2 0.4847.16870-04092013 (CCD25 DEMO) COPYRIGHT 2007-2013, CPI CARD GROUP.

| PRODUCT-LEVEL CONFIGURATION | | |
|---|---|---|
| ORDER LINE ITEM OPTIONS | SPECIFY VALUE ▼ | ← 631 |
| THE FOLLOWING ITEMS ONLY APPLY WHEN AN ORDER FORM IS ENABLED. | | |
| MINIMUM ITEM QUANTITY | ☐ | (BLANK, FOR SINGLE QUANTITY) |
| MAXIMUM ITEM QUANTITY | ☐ | (BLANK, FOR UNLIMITED) |
| VALID QUANTITIES | < > | (E.G., 100, 250, 500) |
| MINIMUM ITEM VALUE | ☐ | (BLANK, FOR NONE) |
| MAXIMUM ITEM VALUE | ☐ | (BLANK, FOR UNLIMITED) |
| DELIVERY/NEED BY DATE | ☑ ENABLE DELIVERY/NEED BY DATE ← 632 | |
| | MIN HORIZON 7 DAYS (BLANK FOR NONE) | |
| | MAX HORIZON 90 DAYS (BLANK FOR NONE) | |
| PROMO CODE | ☐ ENABLE PROMOTIONAL/DISCOUNT CODE | |
| FULFILLMENT OPTIONS | SPECIFY VALUE ▼ | ← 633 |
| MEDIA TYPE | EMAIL ▼ | |
| FULFILLMENT METHOD | AUTOMATED ▼ | |
| DATA FILE | ☐ ENABLE UPLOAD OF A FULFILLMENT DATA FILE ← 634 | |
| PACKAGING OPTIONS | SPECIFY VALUE ▼ | ← 635 |
| OPTIONS | ☑ ENABLE PACKAGING ← 636 | |
| | ☐ ENABLE A DELIVERY MESSAGE | |
| DENOMINATION OPTIONS | SPECIFY VALUE ▼ | ← 637 |
| OPTIONS | ☑ ENABLE DENOMINATION SELECTION | |
| VALID DENOMINATIONS | 0-200 < > | (E.G., 10, 20, 50, 100 OR 0-200) ← 638 |
| PROOFING OPTIONS | SPECIFY VALUE ▼ | ← 639 |
| OPTIONS | ☑ ENABLE ON SCREEN REVIEW | |
| | ☐ ENABLE PROOF FILE DOWNLOAD | ← 640 |
| | ☐ REQUIRE PROOF APPROVAL | |
| | | CANCEL  SAVE |

MYCA CDD v2 0.4847.16870-04092013 (CCD25 DEMO) COPYRIGHT 2007-2013, CPI CARD GROUP.

EDIT CUSTOMER

| BASIC | SITE SETUP | ORDERING | PRODUCTS | HANDLING |

CUSTOMER-LEVEL PRODUCTS — 652

THE FOLLOWING ARE PRODUCT TYPES THAT HAVE BEEN CREATED FOR THIS CUSTOMER OR THAT HAVE BEEN CUSTOMIZED FROM A PARENT CUSTOMER.

| FROM CUSTOMER | NAME | REFERENCE CODE | STATUS | ACTIONS |
|---|---|---|---|---|
| CPI CARD GROUP | B2B PLASTIC CARDS | PLASTICB2B | ACTIVE | EDIT \| DELETE... |
| CPI CARD GROUP | B2C PLASTIC GIFTS | PLASTICB2C | ACTIVE | EDIT \| DELETE... |
| CPI CARD GROUP | eGIFTS | EGIFT | ACTIVE | EDIT \| DELETE... |

NEW PRODUCT TYPE... — 658

PARENT-LEVEL PRODUCTS

THE FOLLOWING ARE PRODUCT TYPES FROM A PARENT CUSTOMER WHICH CAN BE USED AS-IS FOR THIS CUSTOMER. NO PARENT-LEVEL PRODUCT HAVE BEEN SPECIFIED.

CHILD-LEVEL PRODUCTS CUSTOMIZATION

THE FOLLOWING LIST SHOWS ANY CUSTOMERS THAT ARE CURRENTLY USING THIS PRODUCT TYPE. CHANGES TO THE ORIGINAL PRODUCT TYPE CONFIGURATION MAY IMPACT THEIR USE OF IT.

| FROM PRODUCT | FROM CODE | CUSTOMER | NAME | REFERENCE CODE | STATUS | ACTIONS |
|---|---|---|---|---|---|---|
| B2B PLASTIC CARDS | PLASTICB2B | CARD COMMERCE | B2B PLASTIC CARDS | CCPLASTICB2B | ACTIVE | EDIT \| REMOVE... |
| B2C PLASTIC GIFTS | PLASTICB2C | CARD COMMERCE | B2C PLASTIC GIFTS | CCPLASTICB2C | ACTIVE | EDIT \| REMOVE... |
| eGIFTS | EGIFT | CARD COMMERCE | eGIFTS | CCEGIFT | ACTIVE | EDIT \| REMOVE... |

[CANCEL] [SAVE]

MYCA CDD v2 0.4847.16870-04092013 (CCD25 DEMO) COPYRIGHT 2007-2013, CPI CARD GROUP.

FIG. 20

SYSTEM AND METHODS FOR GENERATING USER INTERFACES FOR CUSTOM CARD DESIGN SESSION

CROSS REFERENCE TO RELATED APPLICATION

This application claims a priority benefit to U.S. Provisional Application No. 61/720,287 filed on Oct. 30, 2012 entitled "PAYMENT CARD E-COMMERCE SYSTEM," the entirety of which is incorporated by reference herein.

BACKGROUND

The use of transaction cards has become increasingly prevalent. Such transaction cards may take the form of credit cards, debit cards, gift cards, electronic gift vouchers, or other card forms that may generally be used for value in a transaction. As the use of such cards has increased, so has the desire to provide customized transaction cards.

For instance, customization of transaction cards may be provided as a service to a business that desires to provide custom branded transaction cards for use in the purchase of the business's goods or services. In this regard, the business may generate custom card designs for transaction cards to be provided to end-user customers. Furthermore, customization may also be provided to individual end-user customers such that customers may have the option of customizing a transaction card. In either regard, the customization of such cards may provide the ability to modify the nature of the card and/or to modify the physical appearance of the card. As such, the ability to customize a card may drive card sales to both businesses and end-user customers by enticing such card purchasers with the ability to customize cards.

In this regard, it may be appreciated that the ability to provide custom card designs may increase card sales for card producers, provide advantages to businesses that desire to provide transaction card to the businesses' customers, and provide advantages to end-user customers. As such, it may be appreciated that the need to provide efficient, user friendly card customization options exist as the user experience for both businesses and customers may be affected by the manner in which a user is able to customize a card. Proposed systems have been developed to this end, such as the one described in U.S. Pat. No. 7,992,774, the entirety of which is incorporated by reference herein. However, as the popularity of customized transaction cards continues to increase, further advancements related to systems for custom card design may further enhance the sales opportunities for card producers and businesses, while further providing increased levels of customer satisfaction for those users that interface with the system.

SUMMARY

In view of the foregoing, the present disclosure includes embodiments of systems and methods related to customization of transaction cards. Specifically, the present disclosure provides a discussion of embodiments for customization of transaction cards that allows for an efficient, user friendly card customization experience for both administrative users of the custom card design system and for end-users (e.g., consumers) of the custom card design system. As such, utilization of the embodiments described herein may facilitate improved customization of transaction cards, thus supporting the continually increasing demand for custom card solutions at a business-to-business and/or business-to-consumer level.

Specifically, the present disclosure may include embodiments of a custom card design system that facilitates a custom card design user interface to be generated by an administrative user in a manner that allows for rapid development and changes to user interfaces (e.g., such that custom card design user interfaces may be generated by a single custom card design system for a plurality of entities and/or a plurality of consumers a variety of locations throughout the world). As such, embodiments of custom card design systems discussed herein may facilitate functionality that allows an administrative user (e.g., a business, retailer, financial institution, service provider organization, card issuer, or the like) to access an administrative user interface. Using the administrative user interface, the administrative user may be able to manage custom card design orders, workflows, card design approvals, and/or consumer user interfaces. In this regard, the administrative user may develop and/or manage consumer user interfaces that are to be provided to consumers to facilitate receipt of customization inputs from the consumer related to the customization of a transaction card. In this regard, the administrative user may be operable to establish one or more consumer user interfaces by selecting and/or providing customer contexts and/or product contexts to be used in generation of the consumer user interface.

For example, an administrative user may wish to create distinct consumer user interfaces to be presented to customers of different businesses that wish to provide customizable transaction cards to the businesses' customers and/or customers in different locations (e.g., customers in different countries). As such, rather than creating completely distinct and independent consumer user interfaces for each locale and/or each business, the custom card design system contemplated herein may allow an administrative user to select from various contextual attributes for use in configuring at least one configurable element of a custom card design user interface template to accommodate usage of the custom card design system with a variety of businesses and/or in a variety of global locations.

In this regard, the custom card design user interface template may be maintained by the custom card design system with at least one customer context dependent configurable element and/or at least one product context dependent configurable element. In an embodiment, the custom card design user interface template may include both a customer context dependent configurable element and a product context dependent configurable element, which may in at least some embodiments be the same element. That is, an element may be configurable based on both a customer context and a product context. For each respective configurable element, a plurality of contextual attributes may be stored that each correspond to respective contexts that may be selected and/or customized based on an administrative users preference. That is, rather than have to create such elements for each consumer user interface created, a specific user interface may be developed by specifying a particular context for a consumer user interface, where the specified context results in generation of the user interface in accord with the particular context desired by the administrative user. As such, different configurations of a consumer user interface may be efficiently modified to create different consumer user interfaces associated with different customer and/or product contexts.

In this regard, a custom card design user interface template may be stored along with different contextual attributes for corresponding configurable elements in the custom card design user interface template. Each of the different contextual attributes may be selectable by the administrative user. In turn, a contextual parameter that governs the configuration of the template (e.g., a contextual parameter that is indicative of at least one customer context and/or at least one product context) may be provided. The contextual parameter may be included in a locator that may be provided to a user to direct a user to a custom card design server. The locator, when utilized by a user to navigate to the custom card design server may result in a payload being delivered to the custom card design server, wherein the payload at least includes the contextual parameter. In turn, the customization parameter may indicate to the custom card design server particular contextual attributes to be used to configure a consumer user interface that is delivered to a user. In turn, the consumer user interface may be operable to receive user inputs regarding customization of a card that may be fulfilled. Thus, when a user navigates to a custom card design server using the locator, the generic custom card design user interface template may be configured in accord with the contextual parameter associated with the locator to generate the consumer user interface with the contextual attributes specified by the administrative user to collect customization inputs from the user.

Accordingly, a first aspect includes a method for generating a custom card design user interface for a custom card design session. The method includes maintaining a custom card design session interface template at a custom card design server comprising at least one configurable element. The custom card design session interface template supports functionality for generating a custom card design by user interaction therewith. For example, the custom card design session interface template may facilitate the receipt of customization inputs from a user that may include, for example, upload of an image for inclusion on a custom card, modification or manipulation of an image provided on a custom card, inclusion of customized text or the like on a custom card, or the like. The method further includes correlating the at least one configurable element to a plurality of preconfigured selectable contextual attributes stored at the custom card design server that each uniquely configure the configurable element in corresponding relative relation to at least one of a customer context or a product context of the custom card design session. In turn, the method includes receiving, from a user computing device, a contextual parameter that is at least partially determinative of the customer context and the product context of the customer card design session. Accordingly, the method further includes selecting a selected one of the plurality of preconfigured selectable contextual attributes at least partially based on the contextual parameter and generating the custom card design user interface for accepting user inputs relative to the functionality for generating a custom card design by configuring the at least one configurable element of the custom card design session interface template at least partially based on the selected contextual attribute.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in an embodiment the contextual parameter may at least partially be based on a location from which the user is redirected prior to accessing the customer card design session. In this regard, the contextual parameter may be included in a URL generated in response to a user clicking on a link at a customers web page. As such, the location from which the user is redirected is the customers web page. In an embodiment, the URL may be an encrypted URL. That is, features (e.g., contexts or the like) of the custom card design user interface may not be discernible from the URL without decryption thereof.

In an embodiment, the at least one configurable element may include at least one of a locale element, a language element, and a currency element. For example, the plurality of preconfigured selectable contextual attributes correlated with the locale element may be selected from a group consisting of a configuration of the date and time entry format of the custom card design user interface, a configuration of the postal address entry format of the custom card design user interface, a configuration of the currency format of the custom card design user interface, a configuration of the language format of the custom card design user interface, or a combination thereof. In an embodiment, the plurality of preconfigured selectable contextual attributes correlated to the language element may each correspond to the language element as represented in a plurality of different respective languages. As such, the language may be selected at least partially based on the customization parameter. As such, each language element may correspond to at least one subject word, and a mapping may be maintained to the at least one subject word represented in the plurality of languages. The plurality of preconfigured selectable contextual attributes correlated to the currency element may each correspond to different respective currency formats. In this regard, the locale element, language element, and/or currency element may be selected to specify a custom card design user interface that may be suited for presentation to a group of customers. For example, the locale element, language element, and/or currency element may be tailored to specific conventions accustomed to by a group of users. As such, the locale element may at least partially based on a country in which a user is located. In this regard, the country in which the user is located may be determinable from the customization parameter.

A second aspect includes a method for configuration of a custom card design session. The method includes maintaining a custom card design session interface template that is configurable at least with respect to a customer context and a product context. The custom card design session interface template includes at least one customer context dependent configurable element that is independent of at least one product context dependent configurable element. In turn, the method may include first storing a plurality of customer contextual attributes for the at least one customer context dependent configurable element of the custom card design session interface template, where each customer contextual attribute corresponds to a corresponding one of a plurality of customer contexts. The method may also include second storing a plurality of product contextual attributes for the at least one product context dependent configurable element of the custom card design session interface template, wherein each product contextual attribute corresponds to a corresponding one of a plurality of product contexts. As such, the method may further include receiving a configuration parameter that is indicative of a customer context and a product context. In turn, the method includes first selecting a selected one of the plurality of customer contextual attributes at least partially based on the customer context and second selecting a selected one of the plurality of product contextual attributes at least partially based on the product context. As such, the method further includes generating a custom card design session by configuring the custom card design session interface template. In the generating, the at least one customer context dependent configurable element is configured at least partially based on the selected one of the plurality of customer contextual attributes and the at least one product context dependent configurable element is configured at least partially based on the selected one of the plurality of product contextual attributes.

A number of feature refinements and additional features are applicable to the second aspect. These feature refinements and additional features may be used individually or in any combination. As such, each of the following features that will be discussed or any of the foregoing features described in relation to the first aspect may be, but are not required to be, used with any other feature or combination of features of the second aspect.

For example, the customer context may be used to select a customer configuration from a customer hierarchical organization of the plurality of customer configurations. As such, the method may include creating a new customer configuration. The new customer configuration may inherit attributes of a parent customer configuration of the customer hierarchical organization. Furthermore, the method may include modifying the at least one customer context dependent configurable element of the new customer configuration from the parent customer configuration. In some embodiments, the modifying may create a child customer configuration of the parent customer configuration in the customer hierarchical organization.

In a similar regard, the product context may be used to select a product configuration from a product hierarchical organization of the plurality of product configurations. As such, the method may include creating a new product configuration, wherein the new product configuration inherits attributes of a parent product configuration of the product hierarchical organization. Furthermore, the method may include modifying the at least one product context dependent configurable element of the new product configuration from the parent product configuration. In some embodiments, the modifying may create a child product configuration of the parent product configuration in the product hierarchical organization.

In an embodiment, the at least one customer context dependent configurable element may include at least one of a locale element, a language element, or a currency element (e.g., as described above in relation to the first aspect). Furthermore, the at least one product context dependent configurable element may include at least one of a product listing, a product customization menu, or a product delivery option.

A third aspect includes a system for use in configuration of a customer card design session. The system includes a custom card design server that maintains a custom card design session interface template that supports functionality for generating a custom card design by user interaction therewith. The custom card design server stores a plurality of preconfigured selectable contextual attributes that each uniquely configure a configurable element of the custom card design session interface template in corresponding relative relation to at least one of a customer context or a product context of the custom card design session. The system further includes a communication module in operative communication with a user computing device to receive a contextual parameter that is at least partially determinative of the customer context and the product context of the custom card design session. The system also includes a custom card design user interface configuration module operable to configure the at least one configurable element of the custom card design user interface based at least in part on the contextual parameter. The custom card design user interface configuration module is operable to send the custom card design user interface comprising the configured configurable element to the user computing device.

A number of feature refinements and additional features are applicable to the third aspect. These feature refinements and additional features may be used individually or in any combination. As such, each of the following features that will be discussed or any of the foregoing features described in relation to either of the first or second aspects may be, but are not required to be, used with any other feature or combination of features of the third aspect.

A fourth aspect includes a method for use of a custom card design system. The method includes providing an administrative interface of the custom card design system for receipt of at least one session configuration parameter from an administrative user of the custom card design system related to a customer context and a product context of a custom card design user interface associated with the administrative user. The method further includes initiating a custom card design session of the custom card design system having the custom card design user interface that supports functionality for generating a custom card design by a user. The custom card design user interface is at least partially based on the customer context and the product context defined by the at least one session configuration parameter.

A number of feature refinements and additional features are applicable to the fourth aspect. These feature refinements and additional features may be used individually or in any combination. As such, each of the following features that will be discussed or any of the foregoing features described in relation to the first, second, or third aspects may be, but are not required to be, used with any other feature or combination of features of the fourth aspect.

For example, in an embodiment, the administrative interface may be operable to generate a locator for directing the user to the custom card design system. In this regard, the locator may include a contextual parameter indicative of the customer context and the product context used to generate the custom card design session. In an embodiment, the initiating operation may occur in response to the user being redirected using the locator.

In an embodiment, the product context may include a selection of at least one of a plurality of card fulfillment mechanisms. For instance, the plurality of card fulfillment mechanisms may at least include physical delivery of a physical card corresponding to the custom card design generated by the user and electronic delivery of an electronic representation corresponding to the custom card design generated by the user. Examples of electronic delivery may include, but are not limited to, delivery via SMS, email, by way of one or more social networks, via a wireless communication (e.g., Bluetooth, Wi-Fi, RFID, etc.), or the like. As such, the at least one session configuration parameter may include a selection of at least two of the plurality of card fulfillment mechanisms (e.g., by an administrative user) for inclusion in the custom card design user interface for selection by the user (e.g., the consumer user) with respect to the custom card design generated by the user. In an embodiment, at least a portion of the functionality for generating a custom card design by a user may be identical for any of the at least two of the plurality of card fulfillment mechanism. Thus, for example, customization of the appearance of the card may be the same for the user regardless of whether the card is to be physically delivered or electronically delivered.

In an embodiment, the customer context may include a selection of at least one configurable display element associated with an appearance of the custom card design session. For example, the at least one configurable display element may include a branding element and/or a background image that may correspond to the customer context of the custom card design user interface.

In an embodiment, for at least one of the customer context or the product context, the administrative interface comprises a hierarchical organization of contexts. The hierarchical organization of contexts may be modifiable. For instance, a default selection of the customer context and the product context is based at least in part on a parent configuration in the hierarchical organization of contexts.

A fifth aspect includes a method for configuration of a custom card design session. The method includes maintaining a custom card design session interface template that is configurable at least with respect to a customer context and a product context. The custom card design session interface template includes at least one customer context dependent configurable element that is independent of at least one product context dependent configurable element. The method may include first storing a plurality of customer contextual attributes for the at least one customer context dependent configurable element of the custom card design session interface template and second storing a plurality of product contextual attributes for the at least one product context dependent configurable element of the custom card design session interface template. In this regard, each customer contextual attribute corresponds to a corresponding one of a plurality of customer contexts. Additionally, each product contextual attribute corresponds to a corresponding one of a plurality of card fulfillment mechanisms. The method further includes receiving a configuration parameter that is indicative of a customer context and a product context. The method further includes first selecting a selected one of the plurality of customer contextual attributes at least partially based on the customer context and second selecting at least one of the plurality of product contextual attributes at least partially based on the product context. In turn, the method further includes generating a custom card design session by configuring the custom card design session interface template. In the generating operation, the at least one customer context dependent configurable element is configured at least partially based on the selected one of the plurality of customer contextual attributes and the at least one product context dependent configurable element is configured at least partially based on the selected at least one of the plurality of product contextual attributes.

A number of feature refinements and additional features are applicable to the fifth aspect. These feature refinements and additional features may be used individually or in any combination. As such, each of the following features that will be discussed or any of the foregoing features described in relation to the first, second, third, or fourth aspects may be, but are not required to be, used with any other feature or combination of features of the second aspect.

For example, at least one of the plurality of product contextual attributes may include a selection of at least one of a plurality of card fulfillment mechanisms by the administrative user. The plurality of card fulfillment mechanisms may at least include physical delivery of a physical card corresponding to the custom card design generated by the user and electronic delivery of an electronic representation corresponding to the custom card design generated by the user. The at least one of the plurality of product contextual attributes includes a selection of at least two of the plurality of card fulfillment mechanism for inclusion in the custom card design user interface for selection by the user with respect to the custom card design generated by the user. That is, an administrative user may select two or more fulfillment mechanisms (e.g., electronic delivery and physical delivery) to be presented to the consumer user in the consumer user interface. The user may then select from the fulfillment mechanism options presented for fulfillment of the card (e.g., the consumer user may select electronic delivery, physical delivery, or both).

BRIEF DESCRIPTION OF THE DRAWINGS

FIGS. 9 and 10 are screen shots of embodiments of a customer user interfaces with different respective configured configurable elements based on at least different respective customer contexts and product contexts of the custom card design session interface template of FIG. 8.

Figure 13:
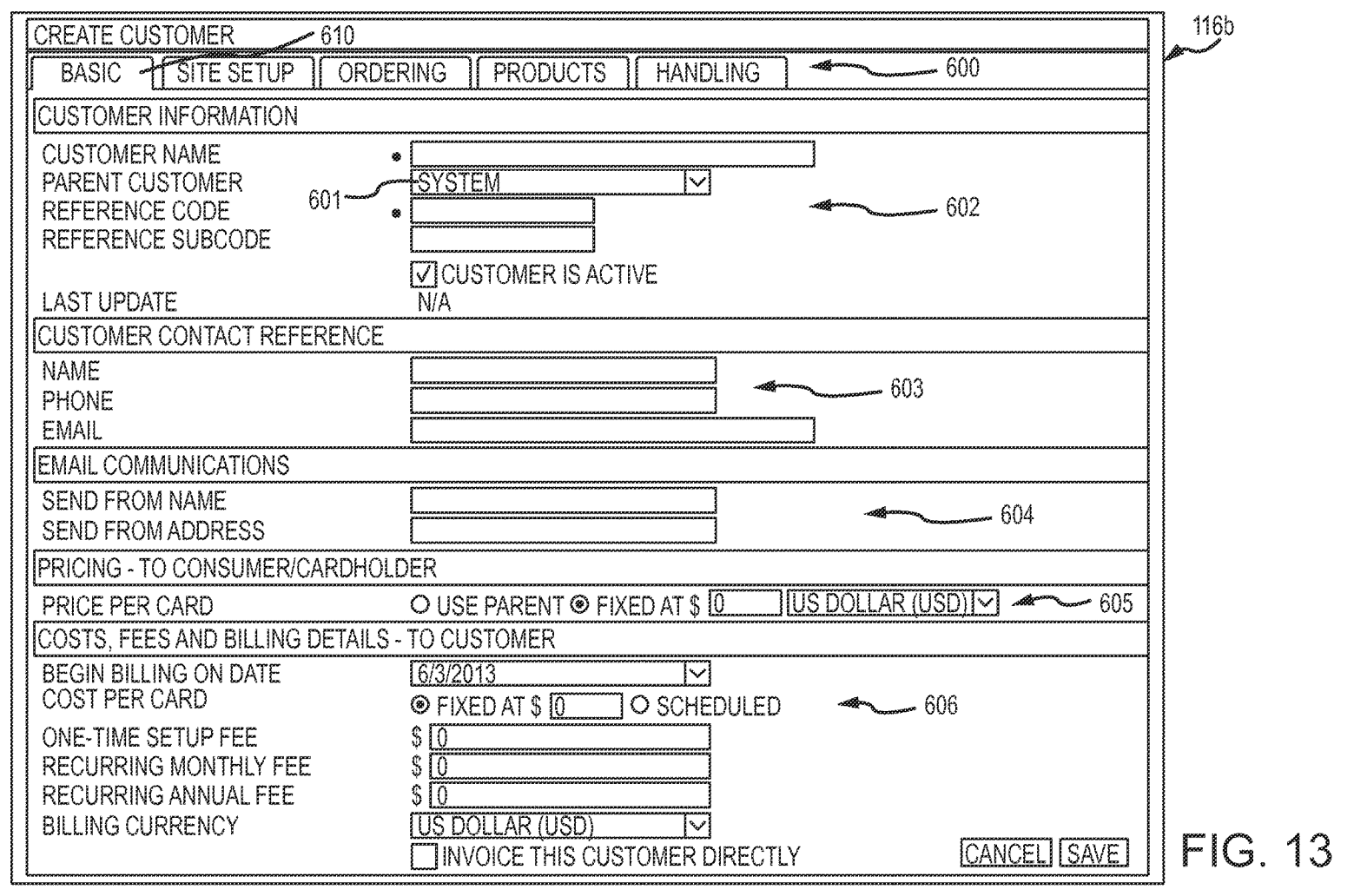

FIGS. 12-20 are screen shots of an embodiment of an administrative user interface for use in generation of a custom card design consumer user interface based on at least one customer context and at least one product context.

DETAILED DESCRIPTION

Figure 1:
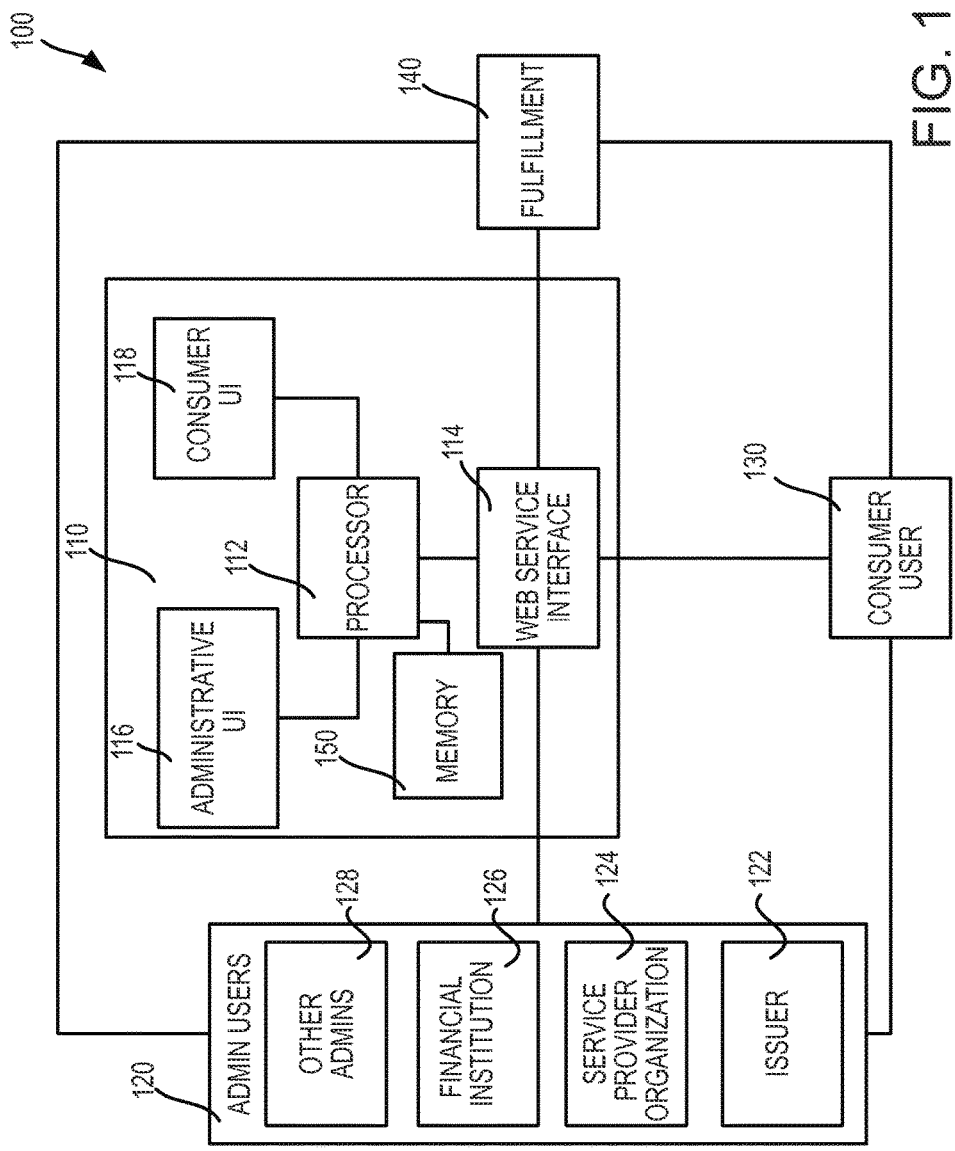
FIG. 1 is a schematic view of an embodiment of a card customization system.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

With reference to FIG. 1, an embodiment of a custom card design system 100 is shown. The custom card design system may include a custom card design server 110. The custom card design server 110 may include a processor 112 that is operable to control operation of the custom card design server 110. The custom card design server 110 may also include a web service interface 114. The web service interface 114 may provide system messaging capabilities to users of the customer card design system 100 as will be described in greater detail below. In short, the web service interface 114 may provide access to an administration user interface 116 and/or a consumer user interface 118. The respective user interfaces 116 and 118 may each facilitate different respective functionality of the custom card design server 110. For example, the administrative user interface 116 may allow an administrative user 120 the ability to configure a consumer user interface 118 accessible by a consumer user 130, wherein the configuration is by way of customer contexts and/or product contexts defined in the administrative user interface 116 by the administrative user 120.

In this regard, the custom card design system 100 may include one or more types of administrative users 120 and one or more consumer users 130. As shown the administrative users 120 may include card issuers 122, service provider organizations 124, financial institutions 126, or other appropriate administrative users 128. The administrative user(s) 120 may access the administrative user interface 116 of the custom card design server 110 by way of the web service interface 114 to facilitate administrative tasks of the custom card design server 110 as will be described in greater detail below.

For instance, the administrative user interface 116 may allow administrative users 120 the option to establish or select customer contexts and product contexts that may drive the appearance and/or functionality of the customer user interface 118. The consumer user interface 118 corresponding to the customer contexts and/or product contexts established or selected by the administrative user 120 may be associated with a contextual parameter that is indicative of the customer context and/or product context. In this regard, consumer users 130 may be provided a consumer user interface 118 in a custom card design session based on the contextual parameter, which may be received by the custom card design server 110 when the consumer user 130 requests the consumer user interface 118. In the custom card design session, the consumer user interface 118 may be generated in part based on the customer and/or product contexts indicated by the contextual parameter received when the consumer user 130 navigates to the custom card design server 110. In turn, the consumer user 130 may be operable to create a customized card design using the customer user interface 118 that may be provided to a fulfillment processor 140 for fulfillment of the customized card that may in turn be provided to the consumer user 130 and/or a third party recipient (not shown in FIG. 1).

Figure 2:
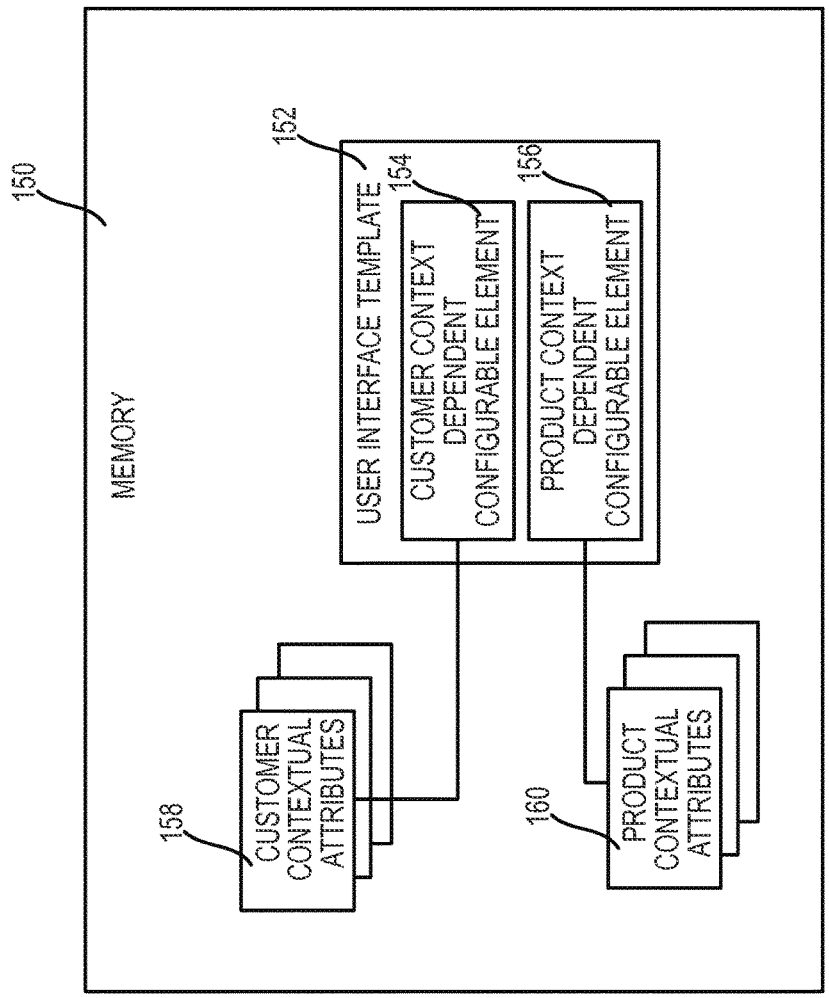
FIG. 2 is a schematic view of an embodiment of a memory of the card customization system of FIG. 1.

The custom card design server 110 may also include a memory 150. The memory 150 may include a non-transitory computer readable medium that stores instructions executable by the processor 112 to control the operation of the system 100 as described herein. Additionally and with further reference to FIG. 2, the memory 150 may store at least one user interface template 152. The user interface template 152 may include at least one customer context dependent configurable element 154 and/or at least one product context dependent configurable element 156. The memory 150 may also include customer contextual attributes 158 that are stored in corresponding relation to the at least one customer context dependent configurable element 154. As may be appreciated in FIG. 2, each of the configurable elements 154 and 156 may have a plurality of contextual attributes 158 or 160, respectively, that may be used to configure the configurable element 154 or 156. In this regard, each of the customer contextual attributes 158 may each correspond with a different customer context. The contextual attributes 158 and 160 may be generated by an administrative user 120 and/or may include content (e.g., images, text, etc.) received from an administrative user 120.

As such, for different respective customer contexts, one of the customer contextual attributes 158 may be used to configure the customer context dependent configurable element 154 to product a consumer user interface 118. Similarly, the memory 150 may also include product contextual attributes 160 that are stored in corresponding relation to the at least one product context dependent configurable element 156. Each of the product contextual attributes 160 may each correspond with a different product context. As such, for different respective product contexts, one of the product contextual attributes 160 may be used to configure the product context dependent configurable element 156 to product a consumer user interface 118. The configuration of a consumer user interface 118 by way of configuring at least one customer context dependent configurable element 154 and/or at least one product context dependent configurable element 156 to generate a consumer user interface 118 associated with a correspond customer context and/or product context will be discussed in greater detail below in relation to FIGS. 4-10. An embodiment of an administrative user interface 116 that allows customer contextual attributes 158 and/or product contextual attributes 160 to be selected, established, and/or provided is described below in relation to FIGS. 12-20.

Figure 3:
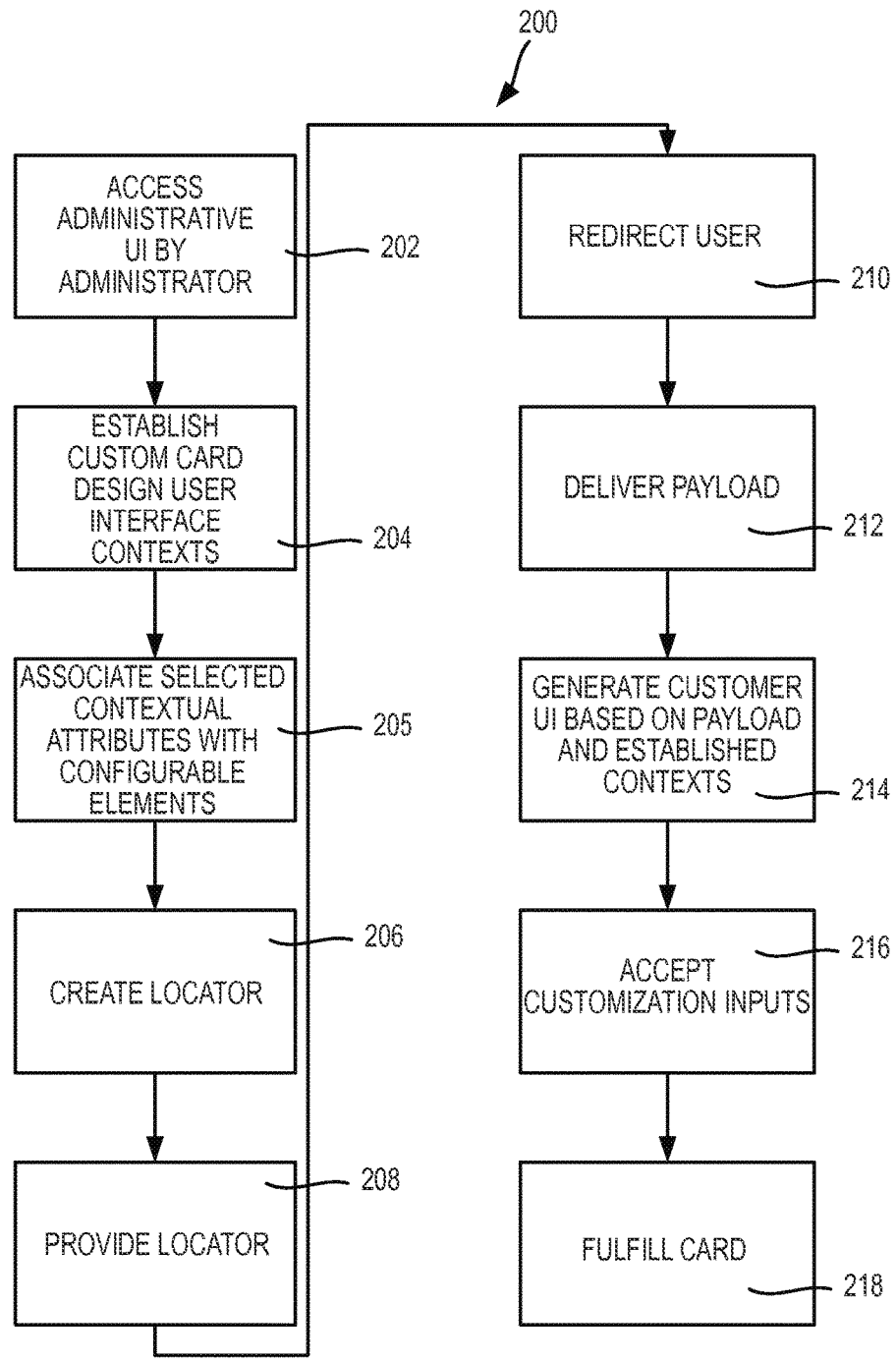
FIG. 3 is a flow chart depicting an embodiment of a method for card customization.

With further reference to FIG. 3, a method 200 of operation of the custom card design system 100 is shown. As such, in the description of the method 200 of FIG. 3, reference will be made to the components of the system 100 shown in FIGS. 1 and 2. However, it may be appreciated that the method 200 may also be carried out with respect to systems that vary with respect to the system 100. Accordingly, references to the system 100 are for explanatory purposes only.

The method 200 may include accessing 202 the administrative user interface 116 by an administrative user 120. In this regard, the administrative user 120 may establish 204 a consumer user interface 118 that includes one or more customer contexts and/or one or more product contexts. It may be appreciated that the establishing 204 may include selection of a customer contextual attribute 158 and/or a product contextual attribute 160 from preconfigured contextual attributes and/or the establishing 204 may include providing an attribute for configuration of a configurable element 154 or 156 (e.g., uploading an image such as a logo, background, or the like).

As referenced above, the establishing 204 of the contexts of the consumer user interface 118 may drive the appearance and/or functionality of the consumer user interface 118 that may be presented to a consumer user 130 of the system 100. In this regard, an administrative user 120 may select an associated contextual attribute 158 and/or 160 for one or more configurable elements 154 and/or 156 of a custom card design user interface template 152. Accordingly, customer contextual attributes 158 may include, for example, the selection and/or provision of images, themes, formatting instructions, color combinations, and the like, by the administrative user 120 for use in determining the look-and-feel, functionality, and/or formatting of a consumer user interface 118. Specifically, examples of customer contextual attributes

158 may include but are not limited to selection of contextual attributes related to locale elements, language elements, and currency elements for a resulting consumer user interface 118 that will be described in greater detail below. Other examples of customer contextual attributes 158 include different images and/or templates used to affect the visual appearance of the customer user interface 118. Other customer contextual attributes 158 may include, for example, other selectable attributes such as the font, font size, font color, time and date conventions, available image libraries, card template designs, card customization options (e.g., zooming, panning, resizing, rotation, etc.), or the like. Further still, product contextual attributes 160 including, for example, product types, available product fulfillment mechanisms, product packaging options, shopping cart options, order value options, order quantity options, and the like may also be selectable by an administrative user 120.

In turn, the selections of an administrative user 120 regarding the product contexts and/or customer contexts may be associated to a contextual parameter. The contextual parameter may be indicative of the customer contextual attributes 158 and product contextual attributes 160 established and/or selected by the administrative user 120. As such, the contextual parameter may be received by the custom card design server 110 (e.g., as will be described in greater detail below) used to retrieve the appropriate customer contextual attributes 158 and/or product contextual attributes 160 to generate a consumer user interface 118 having the appropriate customer contexts and product contexts as defined by the administrative user 120.

In any regard, the method 200 may also include creating 206 a locator related to the consumer user interface 118 that was established 204 by the administrative user 120. In this regard, the locator may be operable to direct a consumer user 130 to the custom card design server 110 and may include the contextual parameter (e.g., as part of a payload that is delivered to the custom card design server 110 when a user navigates to the server 110). In any regard, because the contextual parameter may be provided to the server 110 when a consumer user 130 uses the locator to navigate to the custom card design server 110, the consumer user 130 may be provided with the configured consumer user interface 118 that was established 204 by the administrative user 120 corresponding to the delivered contextual parameter. That is, the contextual parameter included in the locator may be indicative of the customer context(s) and/or product context(s) associated with the consumer user interface 118 such that the custom card design server 110 may generate the appropriate consumer user interface 118 based on the contextual parameter received. In an example, the locator may be uniform resource locator (URL) that facilitates access to the consumer user interface 118 of the consumer card design server 110. In a specific embodiment, the locator may be an encrypted URL that prevents decrypting the URL provided to determine attributes of the resulting consumer user interface 118. That is, the URL may not be used outside of the custom card design server 110 to determine aspects of the consumer user interface 118 based on the encryption of the URL that serves as the locator.

As noted above, the locator may be provided 208 to a customer to facilitate access to a consumer user interface 118 by the consumer user 130 at the custom card design server 110. For instance, the locator may be provided as a hyperlink on a web page (e.g., a web page maintained by an administrative user 120, a customer of the administrative user 120, or another entity). As an example, a retailer that wishes to sell customizable transaction cards may provide a hyperlink including a locator on a web page that is accessible by consumer users 130. Accordingly, upon selection of the hyperlink by the consumer user 130, the consumer user 130 may be redirected 210 from the web page of the retailer to a consumer user interface 118 at the custom card design server 110 that is configured in accord with customer contexts and/or product contexts specified by the retailer through the administrative user interface 116. In connection with the redirection 210 of the consumer user 130 to the consumer user interface 118, the method 200 may also include delivery 212 of a payload. The payload may be embedded in the locator or otherwise provided to the custom card design server 110. The payload may include the contextual parameter that may be indicative of the customer context(s) and/or product context(s) for the consumer user interface 118 to be presented to the consumer user 130 once redirected 210 by the locator. As such, upon receipt of the payload at the consumer card design server 110, the method 200 may include generation 214 of the consumer user interface 118 based on the contexts established 204 by the administrative user 120 as indicated by the contextual parameter.

As may be appreciated, different locators may be provided to different customers (e.g., different retailers) that each correspond to unique respective customer and/or product contexts. As such, a first retailer may generate one or more customer user interfaces 118 based on a first customer context (e.g., including backgrounds, branding elements, and other configurable options in accord with the selections of the first retailer). A second retailer may generate one or more customer user interfaces 118 based on a second customer context (e.g., including backgrounds, branding elements, and other configurable options in accord with the selections of the first retailer). In turn, each retailer may provide unique locators associated with the respective customer contexts on each retailers respective web site. As such, when consumers select the locators at each respective retailers website, the consumers may be directed to the custom card design server 110. However, the custom card design server 110 may generate and deliver different customer user interfaces 118 to consumer users being redirected from each respective retailers site based on the different customer contexts and/or product contexts as indicated by the locators for each respective retailer.

Furthermore, a single retailer may provide different locators corresponding to different customer contexts and/or product contexts on different websites based on different desired contexts for the users whom use the website. As an example, a large retailer may provide different contexts to users in different locales (e.g., different countries). Accordingly, a user of a retailer site in, for example, Norway, may be provided with a different locator than a user of the same retailer site in, for example, the United Kingdom. Thus, the customer contexts for each of the users in the different locales may differ.

In turn, the method 200 may include accepting 216 customization inputs from the consumer user 130 by way of the consumer user interface 118 related to customization of a card design. The accepting 216 may include allowing the user to select the product type, packaging type, customization options (e.g., for the product and/or packaging), input custom text, upload images to be included on a card (e.g., as a logo or a card background), etc. Once the consumer user 130 has completed the customized card design in the design session using the consumer user interface 130, the custom card design may be provided to the fulfillment processor 140 for fulfillment 218 of the card. As will be described in greater detail below, the fulfillment 218 of the card may be provided in a plurality of fulfillment mechanisms (e.g., by way of electronic delivery or physical delivery of the card).

Figure 4:
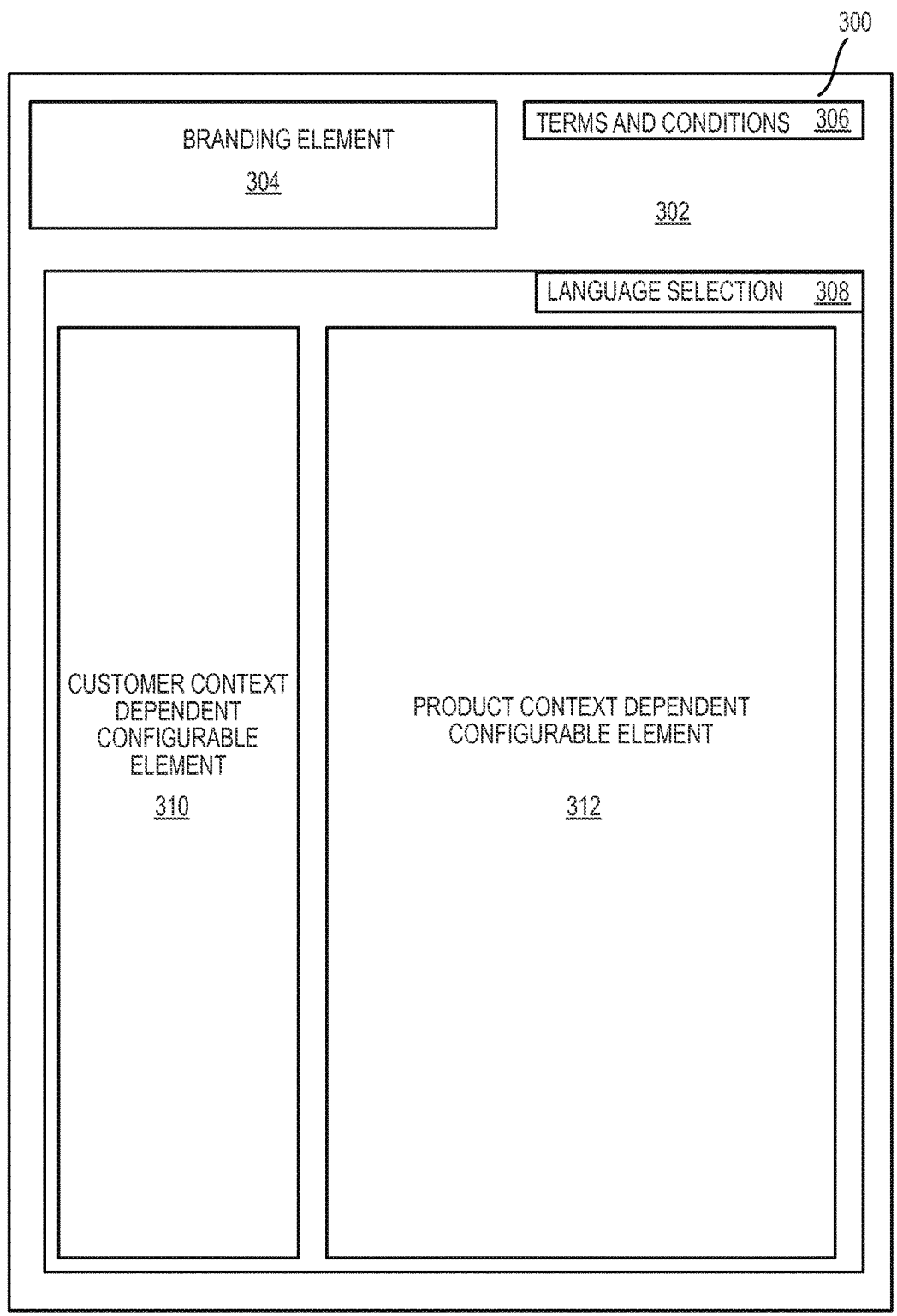
FIG. 4 is a schematic view of an embodiment of a custom card design session interface template having configurable elements that are configurable based on a preconfigured customer or product context.

Turning to FIG. 4, an embodiment of a custom card design session interface template 300 is shown. The custom card design session interface template 300 may include one or more configurable elements (e.g., elements 302-312). The configurable elements 302-312 may each be configurable based on at least one of a customer context and/or a product context as described above. In this regard, for each configurable element, a plurality of contextual attributes 158 and/or 160 may be stored by the custom card design server 110. The contextual attributes 158 and/or 160 may be selectable based on, for example, selection of a locale from a plurality of available locales, selection of a language from a plurality of stored languages, selection of a currency from a plurality of currencies, etc., or may be provided by an administrative user 120 (e.g., a provided image or the like). Specifically, the template 300 may include a background element 302. The template 300 may also include a branding element 304. The template 300 may further include a terms and conditions element 306. Additionally, the template 300 may include a language selection element 308. The template 300 may also include a customer dependent configurable element 310 and a product context dependent configurable element 312.

Figure 5:
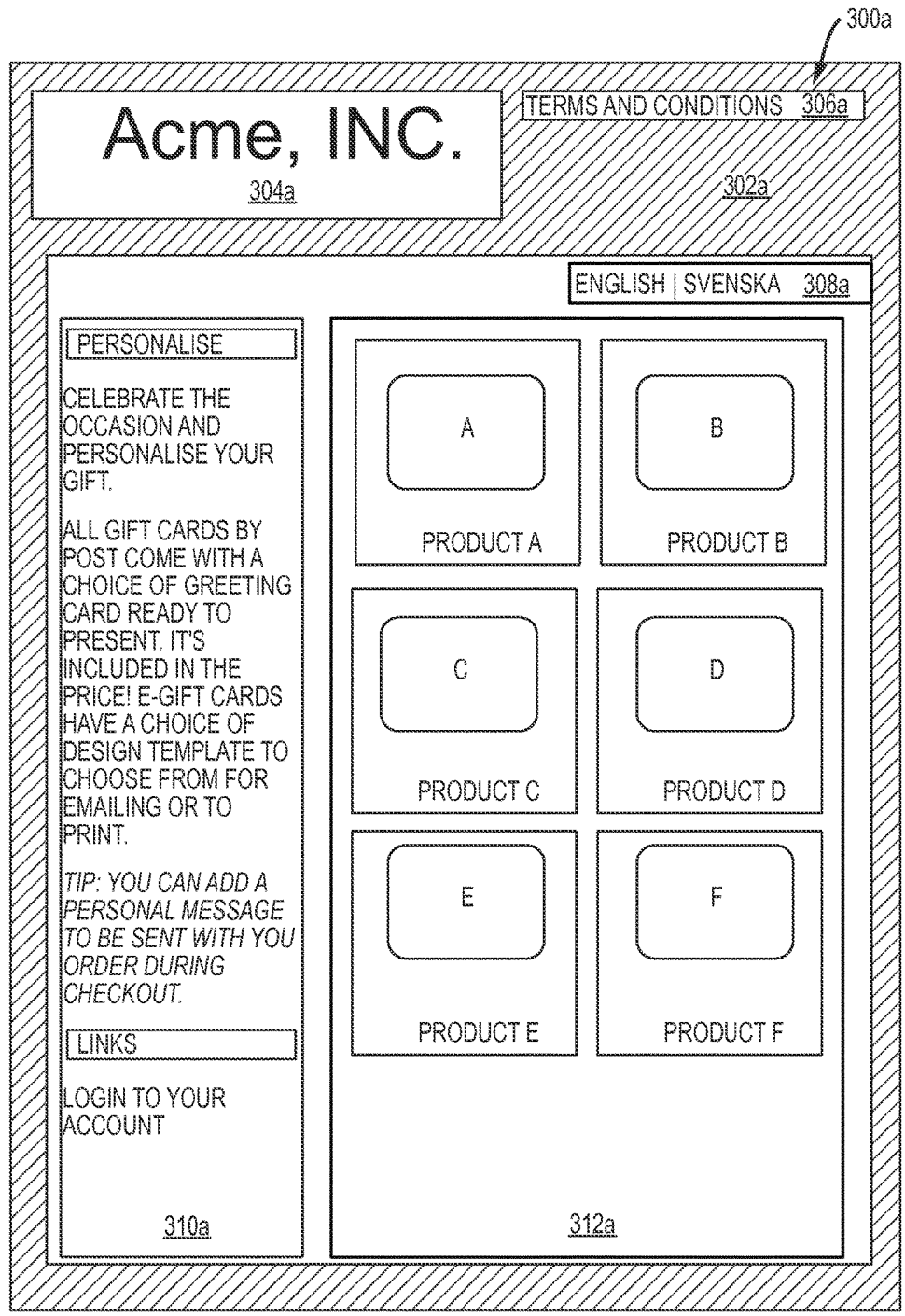
FIGS. 5 and 6 are screen shots of embodiments of a customer user interfaces with different respective configured configurable elements based on at least different respective customer contexts of the custom card design session interface template of FIG. 4.
Figure 6:
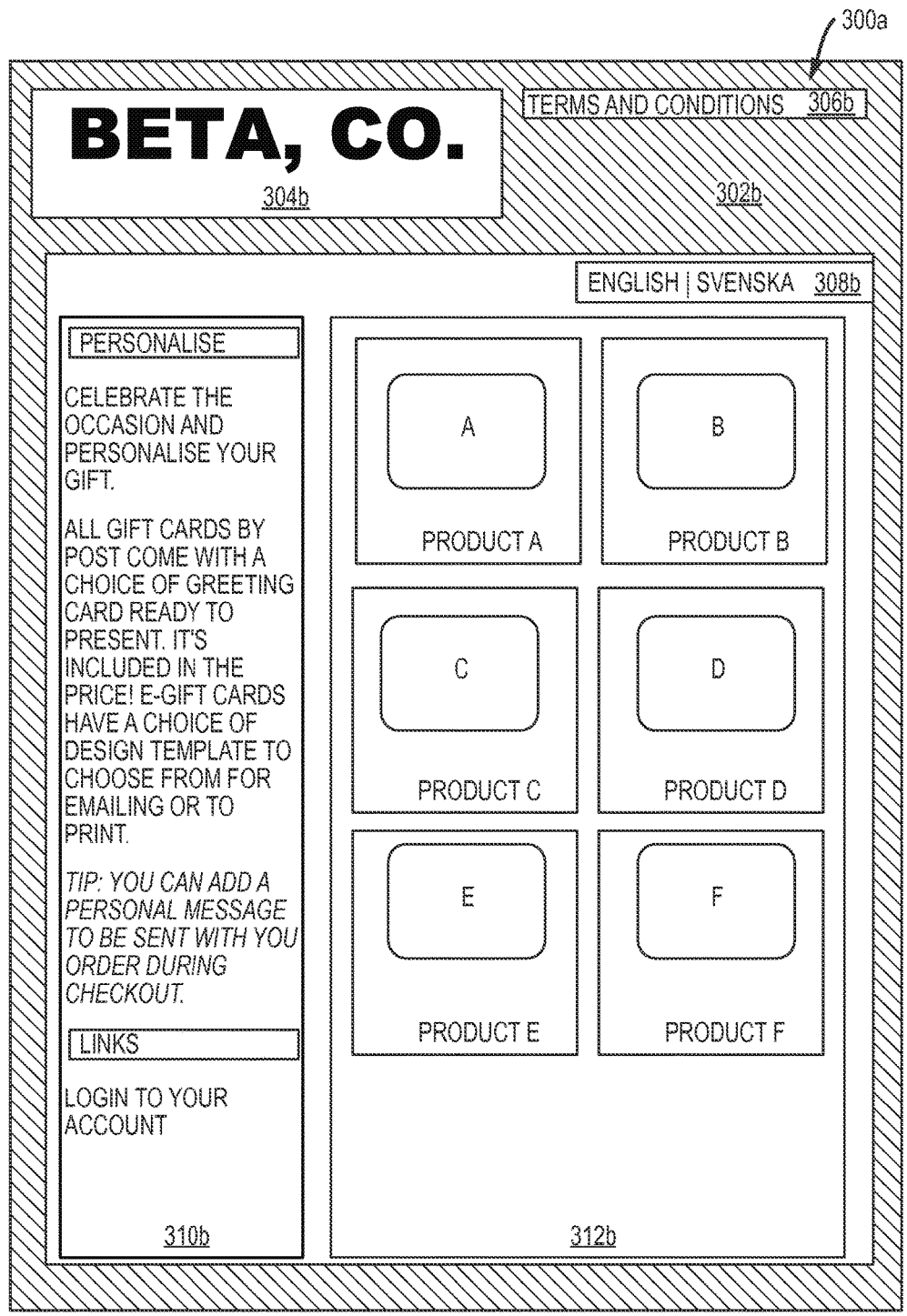

Furthering the example of FIG. 4, FIGS. 5 and 6 each include examples of configured customer user interfaces 300a and 300b that each correspond to the custom card design session interface template 300, albeit with at least different respective customer contexts such that at least some of the configurable elements of the template 300 are configured in different manners with respect to the interfaces 300a and 300b, respectively. For instance, as may be appreciated in FIG. 5, a first customer context associated with the consumer user interface 300a may dictate the configuration of a background element 302a as shown based on a customization parameter that indicates the customer context of the interface 300a (e.g., the customer context may be associated with the background element 302a provided and stored at the server 110). With further reference to FIG. 6, a background element 302b different than background element 302a may be provided for template 300b, which has a different customer context. That is, background element 302b may be associated with the customer context associated with interface 300b. Accordingly, the differing customer contexts of interfaces 300a and 300b result in the background element 300 being configured differently for interfaces 300a and 300b as shown.

In the specific examples shown, the interface 300a is in the context of an "Acme, Inc." branded site while the interface 300b is in the context of a "BETA, CO." branded site. As such, for the customer context associated with interface 300a, the branding element 304a may be a logo associated with the customer context for the interface 300a (i.e., an Acme, Inc. logo that was provided by an administrative user 120 associated with Acme, Inc. through an administrative user interface 116). Similarly, the branding element 304b (i.e., a BETA, CO logo that was provided by an administrative user 120 associated with BETA, CO. through an administrative user interface 116) may be a different logo associated with the customer context for interface 300b. That is, the custom card design server 110 may store both logo 304a and 304b that are each associated with different corresponding customer contexts of the configurable branding element 304 of the template 300. As such, upon receipt of an indication that a design session is to be generated based on a customer context associated with Acme, Inc. (e.g., upon redirection of a consumer user 130 from the Acme, Inc. website using a locator that includes an indication of the customer context associated with Acme, Inc.) the logo 304a may be used to configure the configurable branding element 304, while logo 304b may be used to configure the configurable branding element 304 upon receipt of an indication that a design session is to be generated on a customer context associated with BETA, CO. (e.g., upon redirection of a consumer user 130 from the BETA, CO. website using a locator that includes an indication of the customer context associated with BETA, CO.). As such, the configurable background element 302 and the configurable branding element 304 may be examples of configurable elements that are configurable based on a consumer context of the session. Other examples include a terms and conditions configurable element 306 and customer context dependent configurable element 310, which will be described in greater detail below.

Further still, configurable elements that are configurable based on a product context may also be provided. For instance, product context dependent configurable element 312 may be configurable based on a product context of the session that may be established by an administrative user 120.

Figure 7:
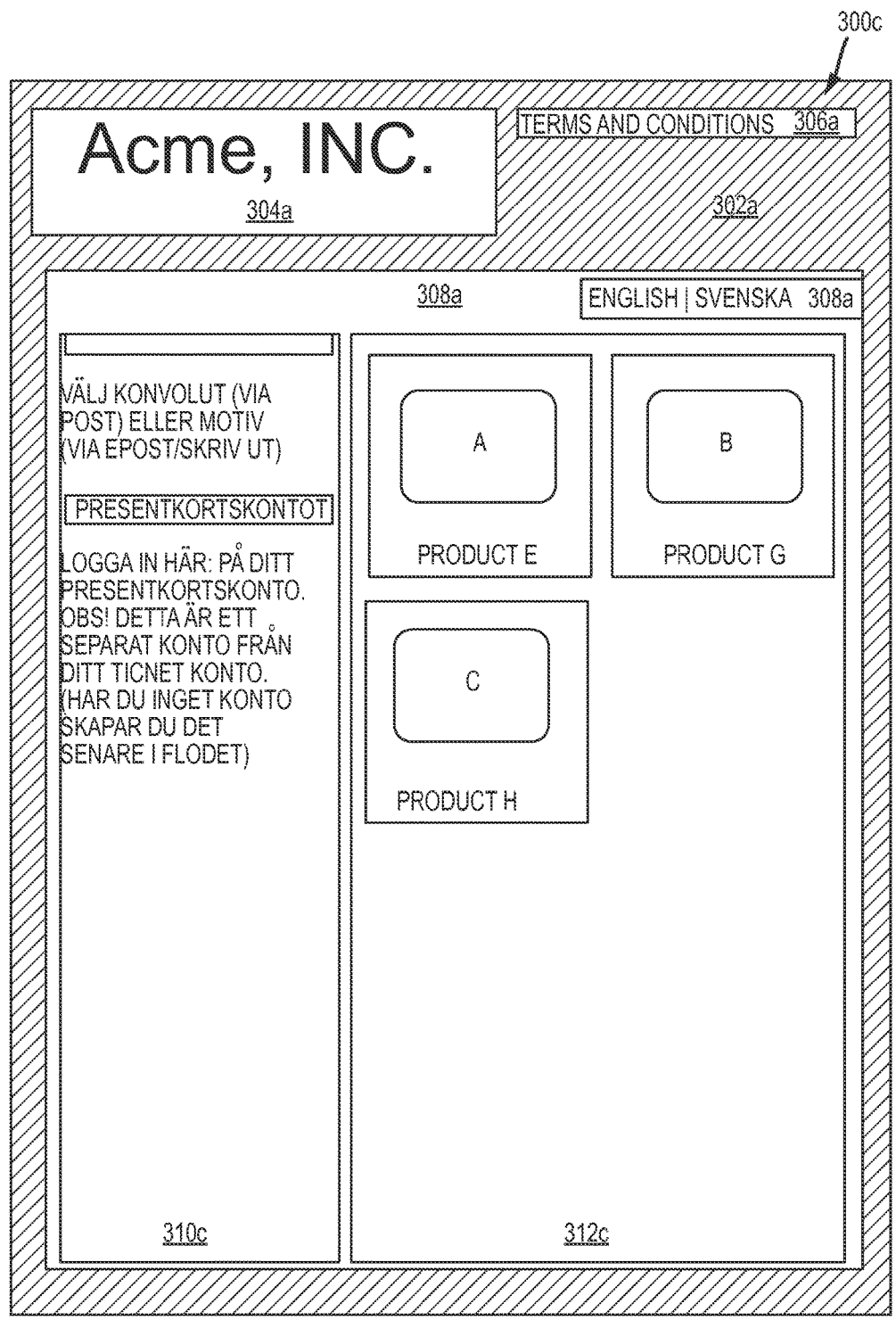
FIG. 7 is a screen shot of an embodiment of a customer user interface template with configured configurable elements based on at least different respective product context of the customer interface template of FIG. 5.

With further reference to FIG. 7 and as may be appreciated upon review of product context dependent configured elements 312a and 312c, it may be appreciated that the configured product context dependent configurable elements 312a and 312c may differ based on differing product contexts defined for user interface 300a and 300c, respectively. Furthermore, it may be appreciate upon review of FIG. 7 in view of FIG. 5 that a different product context may be provided to alter the product context dependent configurable element 312 based upon differing product contexts while maintaining the customer context for the user interface. That is, user interface 300c may differ from user interface 300a in that certain ones of the configurable elements may be changed in view of differing product contexts for the user interface 300c while maintaining certain customer context dependent attributes the same. Specifically as illustrated, configurable elements 302a-308a may remain constant for interface 300c while configurable element 312c may be altered based on a different product context for interface 300c. Specifically, the product context associated with interface 300a may include Products A-F, whereas the product context for the interface 300c may include Products E, Product G, and Product H. In this regard, note that some products may be offered in both product contexts, such that differing product contexts do not per se require mutually exclusive products to be offered to the consumer user 130. In any regard, the customer context and product context may be provided independently such that upon establishment of a customer context, different product contexts may also be defined to alter a subset of the configurable elements without affecting the customer context dependent elements.

Figure 8:
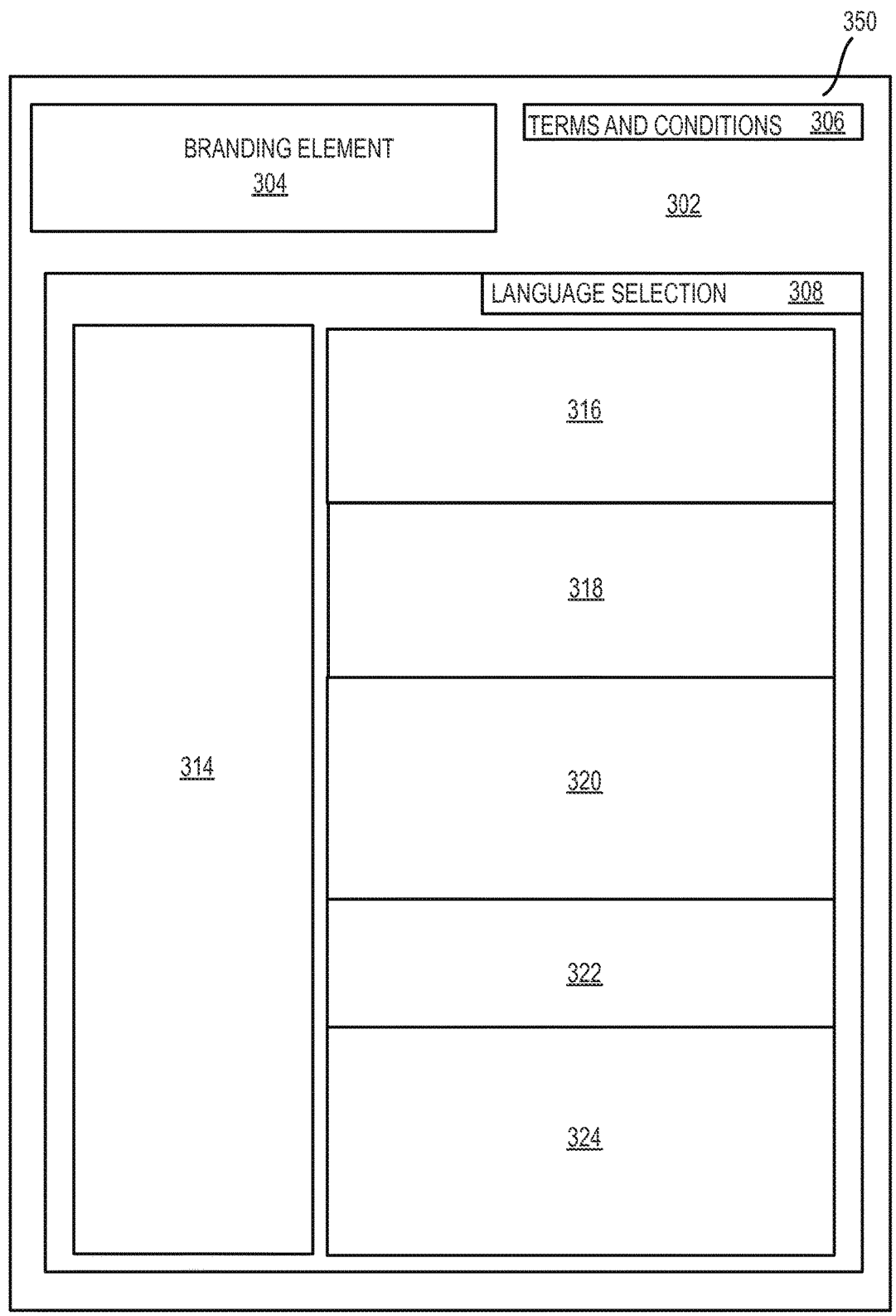
FIG. 8 is a screen shot of an embodiment of another embodiment of a custom card design session interface template with configurable elements.

With further reference to FIG. 8, a second page of a custom card design user interface template 350 is shown. As may be appreciated, certain configurable elements may carry over from the first page of the custom card design user interface template 300. For example, the branding element 304, terms and conditions element 306, background image element 302, and language selection element 308. may all carry over to the second page of the template 350. As such, a consistent user experience may be provided when navigating the custom card design session as at least some of the customer context dependent configurable elements may be the same for the first page of the template 300 and the second page of the template 350. The second page of the template 350 may additionally include configurable elements 314-324.

With further reference to FIGS. 9 and 10, which depict customer interfaces 350a and 350b both based on the second page of the template 350, it may be appreciated that configurable elements 316-324 may differ with respect to different contexts provided for the interfaces 350a and 350b. For instance, elements 316-322 may depend upon a product context and/or a customer contest. For example, at least some of the configurable elements (e.g., any of the configurable elements previously described), may be provided with contexts associated with different locales, languages, and/or currencies. By way of specific example, an administrative user 120 may desire to provide customers in different locations (e.g., different countries) the opportunity to engage with the custom card design server 110 to generate a custom card design. Traditional approaches may require the administrative user 120 to build custom card design interfaces tailored to each country that is mindful of differences based on differing locales. For instance, based on different postal systems in different locations, the fields in a billing address and/or shipping address may differ. Furthermore, changes in locales may provide further differences that should be accommodated for such as different number representations (e.g., differing use of punctuations such as comma and period delimiters in numerical values, etc.).

In this regard, by way of use of the custom card design interface template 300/350, an administrative user 120 may simply specify a customer context that indicates a local for the user interface to be generated based on the template. As such, a plurality of different contextual attributes associated with different locales may be provided for use in configuring one or more of the configurable elements in the template 300/350. By way of specific example, the element may be based on a first customer context associated with a first locale. For instance, it may be appreciated that element 322a includes a date format in the form of (YY/MM/DD), which may be the convention in the locale associated with the customer context of interface 350a. However, the date format in element 322b includes a date format in the form of (MM/DD/YY) associated with a different customer context than that of interface 350a. In this regard, the differing customer contexts between interface 350a and 350b may result in differences related to locale conventions. The date format is simply an example of potential differences that could include differences in any other format, convention, or the like including, for example, different number format conventions, different time conventions, or the like.

Additional specific configurable elements may be provided. For instance, certain elements may comprise configurable language elements may be provided in the template 300/350. For instance, the element 314 may be a language element. In this regard, rather than maintaining multiple consumer user interfaces, one for each language to be provided, element 314 may include key words and/or phrases that are mapped to different languages. For instance, in element 314a, key words may be provided, which in the English language are shown as represented in FIG. 9. Each of these key words may actually be placeholders that are mapped to corresponding phrases in different languages. As such, for the user interface 350a, the customer context for the user interface 300a may include a language element corresponding to the English language. The language may be selectable (e.g., by way of language selection element 308). As may further be appreciated in FIG. 10, element 314b may include text in the Swedish language. However, rather than having to provide the content of element 314 in both languages, the administrative user 120 may simply choose to provide a mapping to the respective Swedish and English language elements. In turn, the selection of the mapping of the language may be indicated by a customer context of the page or may be modified by the language selection element 308.

Further still, currency options may be provided for different configurable elements. As such, one or more of the configurable elements may be currency elements. For example, based on a selected contextual attribute by the administrative user 120, a currency element may be configured in accord with different currencies (e.g., US dollars, UK Pounds Sterling, Euros, etc.). As a specific example, element 316a presents value amounts in terms of Swedish krona. In contrast, element 316b may present value amounts in terms of US Dollars. Again, rather than having to reconstruct those elements requiring use of currencies, each option for different currencies may be provided as mapped contextual attributes that are simply selected by the administrative user 120 when constructing the consumer user interface 118 based on the template 300/350.

Further still, product contextual attributes 160 may be stored that are used to configure product context dependent configurable elements 156. For instance, with reference to product context dependent configurable element 312 of the first page of the template 300, at least one of Products A-F in element 312a may correspond to a first product contextual attribute associated with an e-gift card (i.e., an electronically delivered representation of a customized card design). In turn, such a product context may be used to configure the product context dependent configuration element 312a in the consumer user interface 300a shown in FIG. 5. With further reference to FIG. 7, product configuration element 312c may be configured based on a second product contextual attribute associated with a physically delivered customized gift card. That is, Products E, G, and H may be associated with physically delivered customized card products. In this specific example, the different product contexts may correspond with different mechanisms for fulfillment (e.g., electronic delivery versus physical delivery). As may be appreciated, the product context of a product selected by a consumer user 130 may further dictate configurable elements in the consumer user interface. For instance, as shown in FIGS. 9 and 10, the delivery and shipping element 322a and 322b requests a name and e-mail address of the recipient. In the case of a physically delivered card, the delivery and shipping element 322a and 322b may request information related to a physical delivery address. Thus, the delivery and shipping element 322 may be at least partially dependent upon the product context. As may be further appreciated, the delivery and shipping element 322 may also be configured based on a customer context (e.g., recognizing that different locations may have differently formatted postal codes or the like). In this regard, delivery and shipping element 322 may be dependent upon a product context as well as a customer context.

Also, it may be appreciated that Product E is shown in both interface 300a and 300c. As such, Product E may be fulfilled by way of either electronic delivery or physical delivery. It may be appreciated that at least some customization inputs for Product E may be the same regardless of the fulfillment mechanism chosen by the consumer user 130. For instance, regardless of whether fulfilled by electronic delivery or physical delivery, the customization of the image (e.g., selection of a background, selection of a logo, manipulation of a background or logo, color selections, or other customization parameters) may be identical regardless of the fulfillment mechanism chosen.

It may also be appreciated that other variances in product contexts may be provided including, for example, layout options, card background image library options, approval routing (e.g., by whom the custom card design must be approved), ordering options (e.g., including order form fields, minimum order values, maximum order values, minimum item quantity, maximum item quantity, delivery date selection, etc.), shopping cart options, etc.

In turn, generation of new consumer user interfaces 118 may be simplified for administrative users 120 as the need to completely reprogram or recode the consumer user interface 118 may be eliminated. Rather, the administrative user 120 may simply originate a new customer user interface 118 based on the custom card design user interface template 300/350 and specify the particular contextual attributes associated with the customer context(s) and/or product context(s) to be used for the specific page. Accordingly, for instance, the administrative user 120 may efficiently generate new pages based on desired changes, expansion into new foreign markets, or other instances that require new consumer user interfaces 118.

Figure 11:
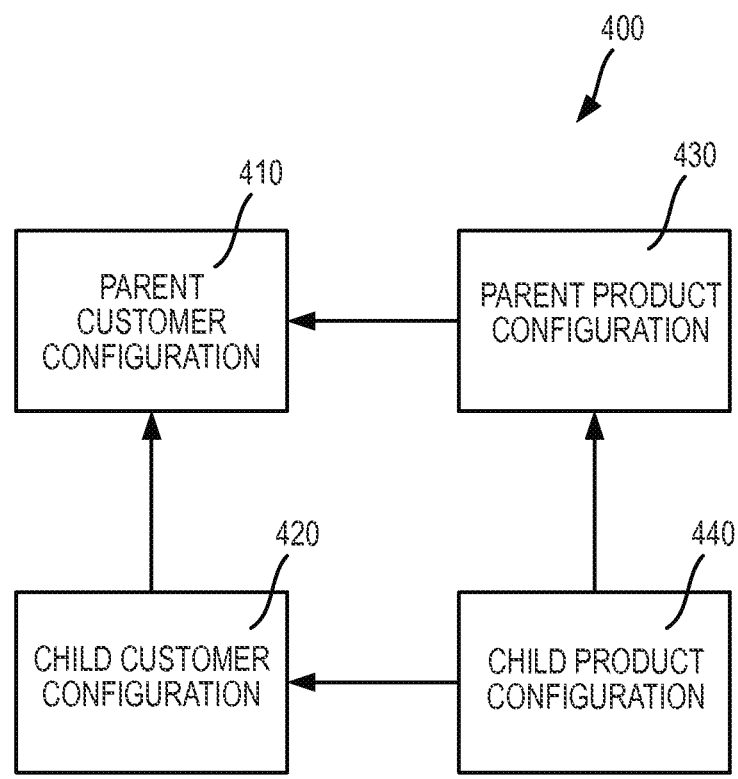
FIG. 11 is a schematic view of an embodiment of a configuration hierarchy for use in generation of customer contexts and product contexts of a custom card design session interface template.

In this regard, it may be that hierarchical relationships between different levels of customer contexts and/or between different levels of product contexts may be established. For instance, with additional reference to FIG. 11, a hierarchical structure 400 is shown. In this regard, a parent customer configuration 410 may be provided. A child customer configuration 420 may inherit one or more customer contexts from the parent customer configuration. Also, a product configuration 430 is provided. An inherited (i.e., child) product configuration 440 is also shown that may inherit one or more product contexts from the product configuration 430. As may be appreciated, the product configuration hierarchy of the parent product configuration 430 and the inherited product configuration 440 may be provided independently from the customer configuration hierarchy of the parent customer configuration 410 and the child customer configuration 420. That is, inheritance of customer contexts may not affect product contexts and/or inheritance of product contexts may not affect customer contexts. However, it may further be appreciated some elements may be affected by customer and/or product contexts.

Accordingly, when an administrative user 120 establishes a consumer user interface 118, the administrative user 120 may select the consumer user interface 118 to inherit customer configurations and/or product configurations. This may assist in development of consumer user interfaces 118. For instance, an entity providing custom card design capability in a number of countries may choose to expand the service to a new country of operation. That new country may have differing local specific attributes (e.g., postal addresses, name conventions, etc.) speak a different language, have a different currency, and/or have other differences that require changes to existing contexts of existing customer user interfaces 118. However, certain attributes 158 and/or 160 of previously established consumer user interfaces 118 may be carried over to the new consumer user interface 118. In this regard, a new consumer user interface 118 may be created that inherits attributes from another consumer user interface 118 that is previously developed (i.e., a parent configuration). The newly established consumer user interface 118 may be in turn changed only with respect to those attributes for which the administrative user 120 desires a change. For instance, a new language and currency may be employed while other attributes (including the background image 302, branding element 304, etc.) for other configurable elements remain unchanged. For instance, a product configuration from a parent configuration may be unchanged. The modification of a parent customer or product configuration may result in a new child configuration.

With further reference to FIGS. 12-20, various screen shots of portions an administrative user interface 116 are depicted that further illustrate the establishment of a consumer user interface 118. In FIG. 12, a first screen 116a of the administrative user interface 116 is shown. The first screen 116a includes a hierarchical listing 510 of customer contexts established for an embodiment of a system 100. As may be appreciated, the hierarchical listing 510 may have a plurality of levels of customer contexts 512-518. For instance, at a first level 512, there may be a "Myca System" level customer context. This may be the parent customer context for all customer contexts provided in the hierarchical listing 510. Thus, the contextual attributes associated with the "Myca System" context may be the default attributes for each child customer context provided in the hierarchical listing 510. In this regard, second level customer contexts 514 (e.g., for "Credit Union Service Provider" and "First National Bank" in the embodiment depicted) may inherit at least some customer contextual attributes from the parent context 512 at the first level 512. Furthermore, each of the second level contexts 514 may alter at least some contextual attributes. As such, the inheritance and/or modification of contextual attributes in the hierarchical listing 510 may continue to a third level 516 and/or fourth level 518 as shown in FIG. 12. The first screen 116a may also provide a reference 520 used to identify the various particular customer contexts contained in the hierarchical listing 510. The first screen 530 may also include a plurality of action buttons 530 that may be used to add users, edit the context, and/or delete the context.

The administrative user interface 116 shown in FIGS. 12-20 may be used to create and/or edit customer contexts for a consumer user interface 116. It may be appreciated that for new customer contexts, each field discussed may be blank and/or populated from a default parent value once the parent context for a new customer context is established. Furthermore, when editing the customer context, the previously saved values for each contextual attribute may be shown to allow an administrative user 120 to edit the contextual attributes.

In any regard, the administrative user interface 116 may have a navigation bar 600. The navigation bar 600 may include tabs related to various aspects of the consumer user interface 118. For example, in FIG. 13, the "Basic" tab 610 is selected. In the basic tab 610, basic customer information including a definition of the parent context 601 may be provided. The parent context 601 may be established for the customer context based on any parent and/or grandparent in the hierarchical listing 510. That is, a customer context need not inherit contextual attributes from a direct parent. The basic tab 610 may also include basic customer information fields 602 that may be defined by the administrative user 120 that may include, for example, a customer name, a reference code, and a selection as to whether the customer context is currently active. The basic tab 610 may also include a customer contact reference 603 that may be defined by the administrative user 120. It may be appreciated the customer contact reference may correspond to the administrative user 120 and/or be someone different than the administrative user 120 establishing the customer context. The basic tab 610 may also include an email communications field 604 that allow the name and email address from communications originating from the system 100 to be defined by the administrative user. The basic tab 610 may also include consumer pricing options 605 that may include a selection of a card price for a card designed by the consumer user 130. That is, the price charged in addition to the value to be added to the card for the use of the custom card design system may be established. The card price selection may be definable by the administrative user 120 and/or may be inherited from the contextual attribute of card pricing from the parent customer context. The basic tab 610 may also include a customer billing field 606 that dictates pricing conventions between a customer (e.g., a retailer, card issuer, or the like) and the custom card design system 100. These values may include, for example, definitions of the price of each card, setup fees, recurring monthly/annual fees, and the desired billing currency to be used to bill the customer or use of the system. As such, it may be appreciated that these options may be defined by an administrative user 120 associated with the custom card design system 100 that may have different permissions than an administrative user 120 of the customer.

Figure 14:
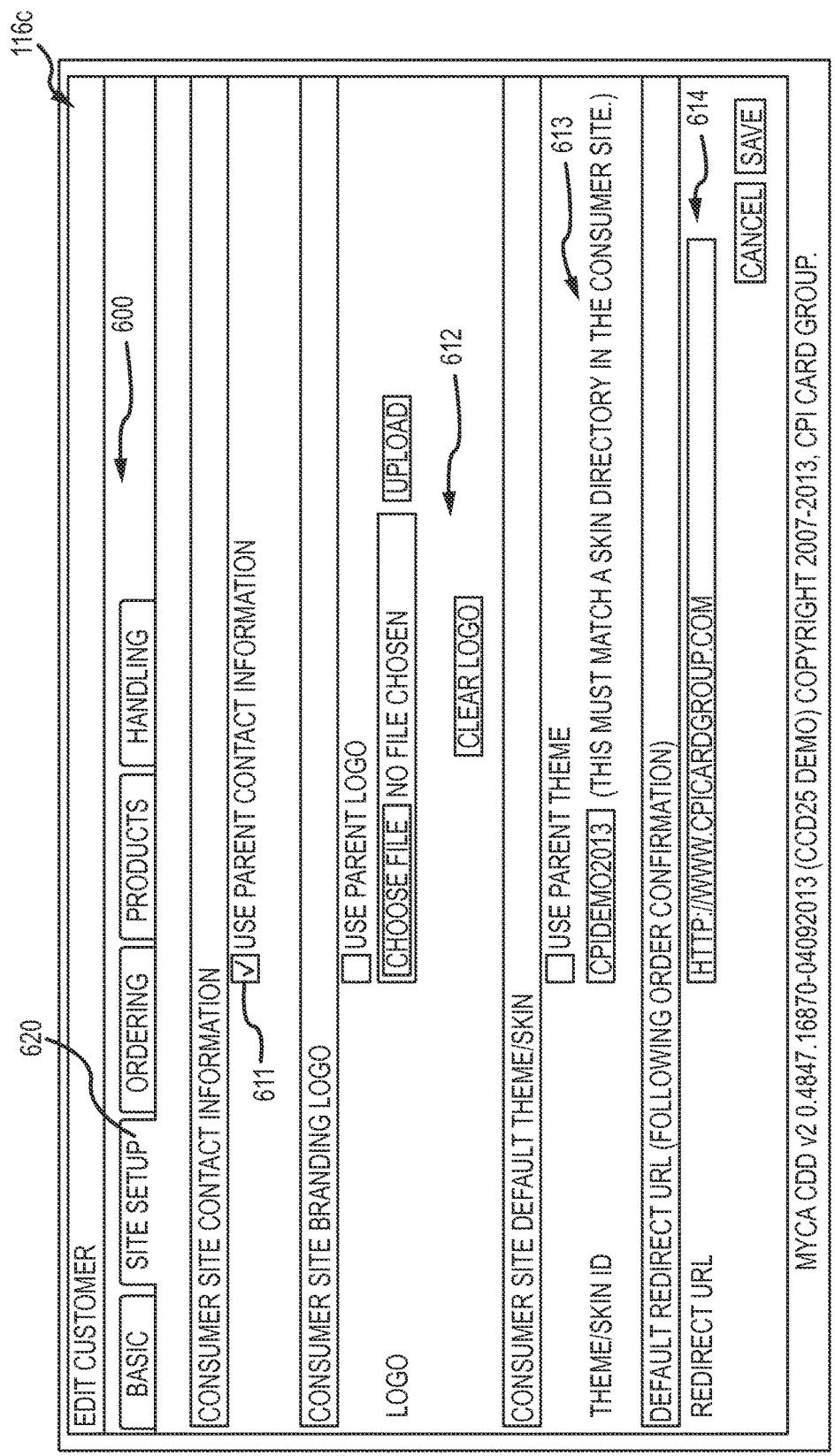

FIG. 14 depicts another screen 116c of the administrative user interface 116 corresponding to a "Site Setup" tab 620. This tab may include a contact information selection field 611 that allows the contact information provided on the site to be defined. As may be appreciated as shown, the contact information selection field 611 may allow for inheritance from the parent customer context as shown. If different contact information for a child customer configuration is desired, such fields may be presented upon deselection of the option to use the parent information in the field 611. The Site Setup tab 620 may also include the branding element selection field 612. For example, as shown above in relation to FIGS. 4-10, a branding element 304 may be definable for presentation on a consumer user interface 118. The branding element selection field 612 may allow a customer contextual attribute to be associated with the branding element 304. As may be appreciated, the parent attribute may be selected, or a different attribute (e.g., logo image or the like) may be uploaded for use.

Furthermore, a theme selection field 613 may be presented. In this regard, a parent theme may be selected and/or a theme ID may be provided. The theme that is selected may include various different customer contextual attributes that may include, for example, a background element 302, a specific locale element, language element, and/or currency element selections as described above. In an embodiment, the theme uploaded by the administrative user 120 may be an hypertext markup language (HTML) style sheet that may define certain site attributes such as colors, fonts, font sizes, frames, or other attributes of the web page comprising the consumer user interface 118. In this regard, an HTML style sheet in accord with the web site of the customer from which a consumer user 130 is redirected may be used to maintain a physically uniform appearance of the consumer user interface 118. As such, the theme that is selected may be generated to include a particular set of selected contextual attributes. The Site Setup tab 620 may also include a redirect field 614. The redirect field 614 may allow an administrative user to define a location a customer is redirected upon completion of the custom card design using the custom card design system 100. In this regard, the custom card design system 100 may be integrated into a site of the administrative user 120 such that the redirection to the custom card design system 100 and redirection to the site of choosing of the administrative user 120 is controlled to provide a relatively seamless user experience.

With further reference to FIG. 15, another screen 116d is depicted shown an "Ordering" tab 630. The Ordering tab 630 may include a locale selection field 621. The locale selection field 621 may provide an option to select a locale, language, and/or currency defined in a parent customer context and/or provide a unique selection of such values in attribute selection fields 622. With further reference to FIGS. 16A-17B, various additional administrative user interface screens are shown that may be used to manage and/or edit locale element attributes and/or currency element attributes. For instance, in FIG. 16A, a listing 700 of selectable locales is shown. Accordingly, an administrative user 120 may select from the listing 700 when establishing a new or editing an existing customer user interface 116. It may be appreciated that different administrative users 120 may have different permission levels. For instance, while a first administrative user 120 may have permission to establish a customer user interface 116 by selecting a locale from the listing 700, other administrative users 120 may have permissions to establish and/or edit the locales 700. In this regard, FIG. 16B depicts a screen 701 for editing a locale. For instance, the screen 701 may include the ability to provide a locale name 702, a locale abbreviation 704, a date/time format 708 for use with the locale, a country 710 associated with the locale, a currency 712 associated with the locale, and a language associated with the locale 714. It may be appreciated that locales are not strictly tied to geographic regions. For instance, a first locale for Spanish speaking users in the United States may be established where the language associated with the locale 714 is Spanish and another locale for English speaking users in the United States may be established with identical characteristics with the exception of the language associated with the locale 714 being English. The context in which either locale is used may be dictated upon a contextual parameter (e.g., whether the user is directed from a retailers Spanish language site or English language site). Furthermore, some attributes may be dictated by the consumer user 130. For example, a language may be selected in a language selection element 308. However, the available languages to be selectable in the language selection element 308 may be determined by an administrative user 120. The screen 701 may also allow for a browser LCID to be defined. As such, at least a portion of the attributes for the locale may be dictated by the locale parameters associated with the browser.

With further reference to FIGS. 17A and 17B, a listing of available currencies 800 is shown in FIG. 17A. FIG. 17B shows a screen 801 for editing a currency. As may be appreciated, parameters associated with the currency may include a name 802, an abbreviation 804, a symbol 806 for use in representing the currency, and a conversion rate 808 relative to US dollars. A user may be able to select the conversion rate 808 be automatically updated (e.g., through an external call to an API or the like).

Returning to FIG. 15, the Ordering tab 630 may also include a shopping cart field 623 that may allow an administrative user 120 to specify contextual attributes related to the provision and/or behavior of a shopping cart in the customer user interface 118. As may be appreciated, the shopping card field 623 may be populated based on a parent customer context and/or may have specific shopping cart attributes defined in field 624. The Ordering tab 630 may also include an order options field 625. The order options field 625 may be populated with parent contextual attributes and/or specific values for an attribute, as an example, use of an order form, selection of order fields, selection of ordering charges, establishment of minimum and/or maximum order values, and/or requirement for order approval may be selected.

With further reference to FIGS. 18 and 19, an additional screen 116e is shown with further options that may be present in the Ordering tab 630. The screen 116e may include product contextual attribute values for presentation in a customer user interface 118. For instance, an order line item options field 631 may be provided. The line item option attributes 632 may be inherited from a parent customer context or product context or may be specifically defined in the line item options field 631. Some line item option attributes 632 that may be selectable by the administrative user 120 may include, for example, a minimum and/or maximum item quantity values, valid quantity increments, minimum and/or maximum item values, delivery date requirements, and the availability of a promotional code entry field.

The Ordering tab 630 may also allow an administrative user 120 to select fulfillment options in the fulfillment options field 633. The fulfillment attributes 634 may be defined based on a parent context and/or specified uniquely by an administrative user. As shown in FIG. 18, one fulfillment option in that may be selected in the fulfillment attributes 634 is the media type associated with the fulfillment mechanism for the card. For example, as shown in FIG. 18, the fulfillment mechanism selected is fulfillment by way of a physical card. As such, further options such as whether cards are to shipped in an activated state, whether a ship-to address may be provided, and whether various shipping options are to be displayed may be selected. Furthermore, selections of a fulfillment method selection and/or whether a fulfillment data file may be uploaded are provided in the fulfillment attributes 634. With further reference to FIG. 19, another fulfillment mechanism selectable in the fulfillment attributes 634 is a media type of email for a card fulfillment mechanism. In this regard, upon selection of email fulfillment as the fulfillment mechanism in the fulfillment attributes 634, an egift card where a representation of the customized card is provided to the recipient in an email. As may be appreciated, other options in the customer and/or product context may be the same regardless of the fulfillment type. For instance, regardless of whether the fulfillment mechanism is by way of a physical card or an email, the customization of the card may be the same. Accordingly, the customization of the card may be identical for either fulfillment mechanism with only the mechanism used for delivery changing based on the selection of the fulfillment mechanism in the fulfillment attributes.

Furthermore, the Ordering tab 630 may include a packaging options field 635. The packaging options field 635 may include packaging attribute selections 636. The packaging attribute selection may include enabling the customer to select packaging to accompanying the fulfillment of the card and/or enabling the customer to provide a delivery message. The Ordering tab 630 may further include a denomination field 637 that may allow selection of valid denominations in demonization attribute fields 638. Again, the values for the denomination attribute fields 638 may be inherited from a parent context or specified uniquely for the customer context being created and/or edited. The Options tab 630 may also include a proofing options field 639 with proofing attribute selections 640. The proofing attribute selections 640 may include selections as to whether on screen review is provided, whether proof file downloading is enabled, and whether proof approval is required. The proofing attribute selections 640 may be based on a parent context or specifically defined for the customer content being created and/or edited.

The Ordering tab 630 may also allow an administrative user 120 to select customization options to be presented to a consumer user 130 for use in customization of a card. For example, there may also be presented to an administrative user 120 an option as to whether to enable modifications to an attribute received from a consumer user 130. For example, transparency modification may be enabled that may convert white background in an image to a transparent background for improved rendering of the image on the customized card. Furthermore, color matching where the color of text of the customized card may be matched to a color in an uploaded image or the like. Alternatively, the administrative user 120 may have the option of whether to present to the consumer user 130 a color selection palate (e.g., a color wheel or the like) to allow for color selection of various customizable parameters of the card design.

With additional reference to FIG. 20, a Products tab 650 is shown that displays the product contexts that are associated with a particular customer and/or family member of the customer. The Products tab 650 may include a listing of customer-level products 652 that displays the product contexts specific to the customer context being created and/or edited (e.g., product contexts that have been modified from parent customer contexts). The Products tab 650 also shows a listing of parent-level products 654 that includes product contexts taken directly from a parent customer context that have not been modified. The Products tab 650 also includes child-level product customizations 656 that utilize the product contexts associated with the customer being created and/or edited. In this regard, the child customers utilizing the product contexts of the customer are shown that may be affected upon modification of the product contexts associated with the customer context being created and/or edited. That is, because the child customer contexts may inherit the product contexts of the customer context being edited, upon modification of the product context, the child contexts may be affected. Furthermore, the Products tab 650 may include a selection to create new product context 658. As may be appreciated, the new product context may be created based on a preexisting product context, a product context modified for use with a parent customer context, or a product context developed for the customer context.

Accordingly, the administrative user interface 116 may be utilized to configure consumer user interfaces 118 by selection of desired contextual attributes by an administrative user 120. In an embodiment, the administrative user interface 116 may also include the ability of an administrative user 120 to automatically generate a consumer user interface 116. For example, an administrative user 120 may select the appropriate contexts for a consumer user interface 116 as described above. The user may then be provided an option to automatically generate a corresponding user interface 116 (e.g., without following a locator or being redirected to the custom card design server). This option may be an explicit privilege that may or may not be provided to all administrative users 120. As such, an administrative user 120 may utilize the automatic generation feature to quickly verify how a consumer user interface 116 that the administrative user 120 creates will be generated for presentation to a consumer user 130. Accordingly, should the administrative user 120 wish to change the consumer user interface 116, the administrative user 120 may do so and again automatically generate the consumer user interface 116 directly from the administrative user interface 118.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for configuration of a consumer web page user interface for a custom card design session executed by a processor of a custom card design server, comprising:

maintaining, in a memory of the custom card design server, a custom card design session interface template that is configurable by the processor of the custom card design server at least with respect to a customer context and a product context for generation of the consumer web page user interface for the custom card design session, wherein the custom card design session interface template includes at least one customer context dependent configurable element and at least one product context dependent configurable element, and wherein the at least one customer context dependent configurable element is independent of at least one product context dependent configurable element;

first storing, in the memory of the custom card design server, a plurality of customer contextual attributes for the at least one customer context dependent configurable element that each uniquely configure the at least one customer context dependent configurable element of the custom card design session interface template, wherein each customer contextual attribute corresponds to a corresponding one of a plurality of customer contexts;

second storing, in the memory of the custom card design server, a plurality of product contextual attributes for the at least one product context dependent configurable element that each uniquely configure the at least one product context dependent configurable element of the custom card design session interface template, wherein each product contextual attribute corresponds to a corresponding one of a plurality of product contexts;

receiving, at the processor of the custom card design server, a configuration parameter by a communication through the Internet in response to activation of a link by a user computer to request the consumer web page user interface, wherein the configuration parameter is indicative of a customer context and a product context of the consumer web page user interface to be presented to the user;

first selecting, using the processor of the custom card design server, a selected one of the plurality of customer contextual attributes corresponding to the customer context for configuration of the at least one customer context dependent configurable element of the consumer web page user interface;

second selecting, using the processor of the custom card design server, a selected one of the plurality of product contextual attributes corresponding to the product context for configuration of the at least one product context dependent configurable element of the consumer web page user interface; and generating, using the processor of the custom card design server, the custom card design session having the consumer web page user interface upon activation of the link and serving the consumer web page user interface to the user computer, wherein the generating comprises configuring the custom card design session interface template such that the at least one customer context dependent configurable element is configured by the selected one of the plurality of customer contextual attributes and the at least one product context dependent configurable element is configured by the selected one of the plurality of product contextual attributes.

2. The method according to claim 1, wherein the customer context is used to select a customer configuration from a customer hierarchical organization of the plurality of customer configurations stored in the memory of the custom card design server.

3. The method according to claim 2, further comprising:
    creating, using the processor of the custom card design server, a new customer configuration, wherein the new customer configuration inherits attributes of a parent customer configuration of the customer hierarchical organization.

4. The method according to claim 3, further comprising:
    modifying, using the processor of the custom card design server, the at least one customer context dependent configurable element of the new customer configuration from the parent customer configuration.

5. The method according to claim 4, wherein the modifying creates a child customer configuration of the parent customer configuration in the customer hierarchical organization.

6. The method according to claim 1, wherein the product context is used to select a product configuration from a product hierarchical organization of the plurality of product configurations stored in the memory of the custom card design server.

7. The method according to claim 6, further comprising:
    creating, using the processor of the custom card design server, a new product configuration, wherein the new product configuration inherits attributes of a parent product configuration of the product hierarchical organization stored in the memory of the custom card design server.

8. The method according to claim 6, further comprising:
    modifying, using the processor of the custom card design server, the at least one product context dependent configurable element of the new product configuration from the parent product configuration.

9. The method according to claim 4, wherein the modifying creates a child product configuration of the parent product configuration in the product hierarchical organization.

10. The method according to claim 1, wherein the at least one customer context dependent configurable element comprises at least one of a locale element, a language element, or a currency element.

11. The method according to claim 1, wherein the at least one product context dependent configurable element comprises at least one of a product listing, a product customization menu, or a product delivery option.

* * * * *